United States Patent
Bai et al.

(10) Patent No.: US 10,635,452 B2
(45) Date of Patent: Apr. 28, 2020

(54) HARDWARE-SHARING BETWEEN A VEHICLE SYSTEM AND ADD-ON DEVICE USING CUSTOMIZED MIDDLEWARE

(71) Applicant: GM Global Technology Operations LLC, Detroit, MI (US)

(72) Inventors: Fan Bai, Ann Arbor, MI (US); John Sergakis, Bloomfield Hills, MI (US); Lakshmi V. Thanayankizil, Rochester Hills, MI (US); David P. Pop, Garden City, MI (US); Xin Yu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 15/483,737

(22) Filed: Apr. 10, 2017

(65) Prior Publication Data

US 2017/0262301 A1    Sep. 14, 2017

Related U.S. Application Data

(63) Continuation-in-part of application No. 15/064,022, filed on Mar. 8, 2016, now abandoned.

(51) Int. Cl.
*G06F 9/4401* (2018.01)
*H04L 29/06* (2006.01)
*H04L 29/08* (2006.01)

(52) U.S. Cl.
CPC ........... *G06F 9/4411* (2013.01); *H04L 67/12* (2013.01); *H04L 67/42* (2013.01)

(58) Field of Classification Search
CPC ......... G06F 9/4411; H04L 67/12; H04L 67/42
See application file for complete search history.

(56) References Cited

U.S. PATENT DOCUMENTS

| | | | | |
|---|---|---|---|---|
| 2006/0271348 A1* | 11/2006 | Rossow | .............. | G06F 9/45537 703/26 |
| 2010/0127847 A1* | 5/2010 | Evans | ................. | G06F 3/04817 340/461 |
| 2012/0075118 A1* | 3/2012 | Basir | ................ | G08G 1/096741 340/905 |

(Continued)

*Primary Examiner* — Gil H. Lee
(74) *Attorney, Agent, or Firm* — Quinn IP Law

(57) ABSTRACT

A vehicle system virtualizing add-on device hardware for a vehicle application. The system includes a computer-readable storage device comprising a client application, middleware components, kernel-space components, and a vehicle application. The client application communicates with an add-on-device server application for virtualizing the add-on-device hardware component at the vehicle. The middleware, in various embodiments, includes an emulated system-call application-program-interface module that receives add-on-device-hardware data from the client application, sends the data to the kernel-space components after processing, and receives the data having been processed at the kernel space. The middleware includes a frameworks-and-abstraction module that receives add-on-device-hardware data, having been processed at the kernel space and the emulated system-call-application-program-interface module and after processing sends the data for use at the vehicle application. In some implementations the middleware and kernel space includes universal-serial-bus components configured to emulate analogous components of the add-on device.

20 Claims, 16 Drawing Sheets

(56) References Cited

U.S. PATENT DOCUMENTS

| | | | |
|---|---|---|---|
| 2013/0167159 A1* | 6/2013 | Ricci | H04W 4/90 |
| | | | 719/319 |
| 2014/0122720 A1* | 5/2014 | Jung | H04L 41/5054 |
| | | | 709/225 |
| 2014/0133545 A1 | 5/2014 | Ploix | |
| 2014/0149025 A1* | 5/2014 | Fazi | F02N 11/0807 |
| | | | 701/113 |
| 2014/0347164 A1 | 11/2014 | De Wind et al. | |
| 2015/0057894 A1* | 2/2015 | Jung | B60W 50/0098 |
| | | | 701/49 |

* cited by examiner

HARDWARE-SHARING BETWEEN A VEHICLE SYSTEM AND ADD-ON DEVICE USING CUSTOMIZED MIDDLEWARE

TECHNICAL FIELD

The present disclosure relates generally to leveraging capabilities of add-on devices at a vehicle platform and more particularly to systems and processes for leveraging sensing capabilities of the add-on devices to enhance vehicle performance or user experience.

BACKGROUND

This section provides background information related to the present disclosure which is not necessarily prior art.

Modern transportation vehicles such as automobiles are equipped with numerous processing and sensing capabilities not available in prior generations of vehicles. Once each vehicle is made, its sensing capabilities are limited to the original sensor hardware installed, though.

Aftermarket upgrades or retrofits are possible, but require undesirably high costs for new hardware, underlying software, labor, and time, and in some cases may adversely affect vehicle aesthetics.

Products exist allowing a vehicle screen to mirror a smartphone screen, and the vehicle screen to be used to control the smartphone. But these products are limited to these functions, being configured only to transfer low-frequency and low-throughput query/reply data.

SUMMARY

The present technology solves these and other challenges by leveraging sensing capabilities of one or more mobile or connectable devices, such as a smart phone, at a vehicle of transportation.

In one aspect, the technology relates to a vehicle system virtualizing or otherwise incorporating sensor data from an add-on device for use by an application running at the vehicle. Example add-on devices include but are not limited to smartphones, dongles, or gadgets that can be plugged into USB or OBD ports of the vehicle, wearable devices like smart watches, personal computers, Internet of Thing (IoT) devices, and sensors or modules within or otherwise of another vehicle, sensors or modules on the road, in the building, or in the sky (X2V).

The system in various embodiments includes a vehicle system virtualizing add-on device hardware for a vehicle application. The system includes a computer-readable storage device including a client application, middleware components, kernel-space components, and a vehicle application. The client application communicates with an add-on-device server application for virtualizing the add-on-device hardware component at the transportation vehicle. The middleware, in various embodiments, includes an emulated or cloned system-call application-program-interface module that receives add-on-device-hardware data from the client application, sends the data to the kernel-space components after processing, and receives the data having been processed at the kernel space. The middleware includes a frameworks-and-abstraction module that receives add-on-device-hardware data, having been processed at the kernel space and the emulated system-call-application-program-interface module and after processing sends the data for use at the vehicle application. In some implementations the middleware and kernel space includes universal-serial-bus components configured to emulate analogous components of the add-on device.

In various embodiments, the client application, the emulated system-call application-program-interface module, the kernel-space components, and the frameworks-and-abstraction module are downloaded to the computer-readable storage device as an after-market addition to the vehicle system.

The vehicle application in various embodiments includes a user application configured to provide user output based on the add-on-device-hardware data processed at the frameworks-and-abstraction module.

The vehicle application may be configured to control or at least affect a vehicle function based on the add-on-device-hardware data processed at the frameworks-and-abstraction module.

The vehicle application includes or is part of a vehicle autonomous driving system, and the vehicle function includes an autonomous-driving function in various implementations.

The emulated system-call-application-program-interface module is configured to emulate an add-on-device system-call-application-program-interface module, and the frameworks-and-abstraction module is configured to emulate an add-on-device frameworks-and abstraction module.

The kernel-space components include a proxy-hardware-device driver configured to emulate an add-on-device hardware-device driver, and the kernel-space components include a virtual subsystem configured to emulate an add-on-device subsystem.

The add-on-device hardware data received at the client application is in some embodiments encoded, by encoder components of the add-on device, and the kernel-space components include a virtual subsystem, a decoder device driver, and a proxy sensor device driver for processing the encoded data.

In various embodiments, the virtual subsystem, when executed by the processing unit, receives add-on-device hardware data from the emulated system call API module of the middleware, and sends the data to the decoder device driver, and the decoder device driver, when executed by the processing unit, interfaces with a decoder-hardware component of the vehicle system for decoding the encoded data, and passes the decoded data to the virtual subsystem, and the virtual subsystem sends the encoded data to the emulated system-call-application-program-interface module.

The client application may include a discover component that, when executed by the processing unit, performs a service-discovery process to determine that the add-on-device hardware is available and can be virtualized at the transportation vehicle. The service-discovery process in various embodiments includes discovering the add-on device and, in response to discovering the add-on device, discovering a hardware service of the add-on device.

In another aspect, the present technology relates to a vehicle system, for use in virtualizing a hardware component of an add-on device for use by a vehicle application being executed at a vehicle of transportation. The system includes a hardware-based processing unit and a computer-readable storage device including a client application, middleware components, kernel-space components, and a vehicle application. The client application that, when executed by the hardware-based processing unit, communicates with an add-on-device server application for virtualizing the add-on-device hardware component at the transportation vehicle. And the middleware includes a universal-serial-bus core driver, client-side, module that, when executed by the hardware-based processing unit, receives add-on-device-hardware data from the client application.

In various embodiments, the middleware includes a universal-serial-bus per-device driver that, when executed by the hardware-based processing unit, receives add-on-device-hardware data processed at the universal-serial-bus core driver, client-side, module, and sends the data for use at the vehicle application.

The client application, the universal-serial-bus core driver, client-side, module, the kernel-space components, and the universal-serial-bus per-device driver may be downloaded to the computer-readable storage device as an after-market addition to the vehicle system.

The kernel space includes a virtual universal-serial-bus host-controller-interface driver that, when executed by the hardware-based processing unit, receives the add-on-device-hardware data from the client application. And the universal-serial-bus core driver, client-side, module, when executed to receive the add-on-device-hardware data from the client application, receives the add-on-device-hardware data from the client application after processing at the virtual universal-serial-bus host-controller-interface driver.

The vehicle application (i) includes a user application configured to provide user output based on the add-on-device-hardware data processed at the frameworks-and-abstraction module; or (ii) is configured to control or at least affect a vehicle function based on the add-on-device-hardware data processed at the frameworks-and-abstraction module.

The virtual universal-serial-bus host-controller-interface driver is configured to emulate an add-on-device universal-serial-bus host-controller-interface driver, the universal-serial-bus core driver, client-side, module is configured to emulate an add-on-device universal-serial-bus core driver, and the universal-serial-bus per-device driver is configured to emulate an add-on-device side stub driver.

The client application includes a discover component that, when executed by the processing unit, performs a service-discovery process to determine that the add-on-device hardware is available and can be virtualized at the transportation vehicle, and the service-discovery process includes discovering the add-on device and, in response to discovering the add-on device, discovering a hardware service of the add-on device.

In another aspect, the technology includes a vehicle system, for use in virtualizing a hardware component of an add-on device for use by a vehicle application being executed at a transportation vehicle, including a computer-readable storage device comprising a client application, middleware components, kernel-space components, and a vehicle application, wherein (a) the client application that, when executed by the hardware-based processing unit, communicates with an add-on-device server application for virtualizing the add-on-device hardware component at the transportation vehicle, (b) the middleware is configured to emulate an add-on-device middleware, (c) the kernel-space components are configured to emulate add-on-device kernel-space components, and (d) the middleware, when executed by the processing unit, sends add-on-device hardware data, having been processed at the kernel-space components and the middleware, to the vehicle application for use.

In some embodiments, the vehicle system and add-one device are configured so that the roles are switched. That is, the client-side is at the add-on device and the server-side is at the vehicle, whereby the add-on device, and an app running at the device, leverage vehicle-sensor data.

Relevant vehicle sensor(s) can include any modern vehicle sensor, such as a radar or other range sensor. The vehicle sensor can include any sensor or sensors mentioned herein primarily as example add-on device sensors—e.g., the vehicle sensor leveraged by the add-on device can include a vehicle IMU sensor, a vehicle barometer, a vehicle camera, etc., just as the add-on device could include versions of these in various embodiments. Accordingly, all of the disclosure herein regarding the first implementations, whereby the client and related structures are at the vehicle system, are considered to hereby also separately disclose corresponding implementations in which they are at the add-on device—these other, second, implementations are not shown and described in detail in the interest of brevity, and as the present disclosure conveys the alternative arrangement—structures and functions—sufficiently.

In a contemplated embodiment, each device is configured to virtualize, or otherwise leverage, and use, sensor data from the other. Each can include server components and client components, for instance—structure being present and configured at each, the vehicle and add-on device, that is capable of performing respective server and client duties. Accordingly, all of the disclosure herein regarding the first and second implementations, are considered to hereby also separately disclose corresponding third implementations in which both the vehicle system and the add-on device have the client and server structure and functions—the third implementations are not shown in detail in the figures and described in the interest of brevity, as the present disclosure and reference are sufficient to convey the structures and functions provided.

In various implementations, the transportation vehicle uses data from a particular type of add-on device sensor, and is not itself equipped with the type of sensor. Similarly, for some of the embodiments in which an add-on device uses sensor data from a certain type of vehicle, the add-on device is not itself equipped with the type of sensor.

Other aspects of the present technology will be in part apparent and in part pointed out hereinafter.

Figure 1:
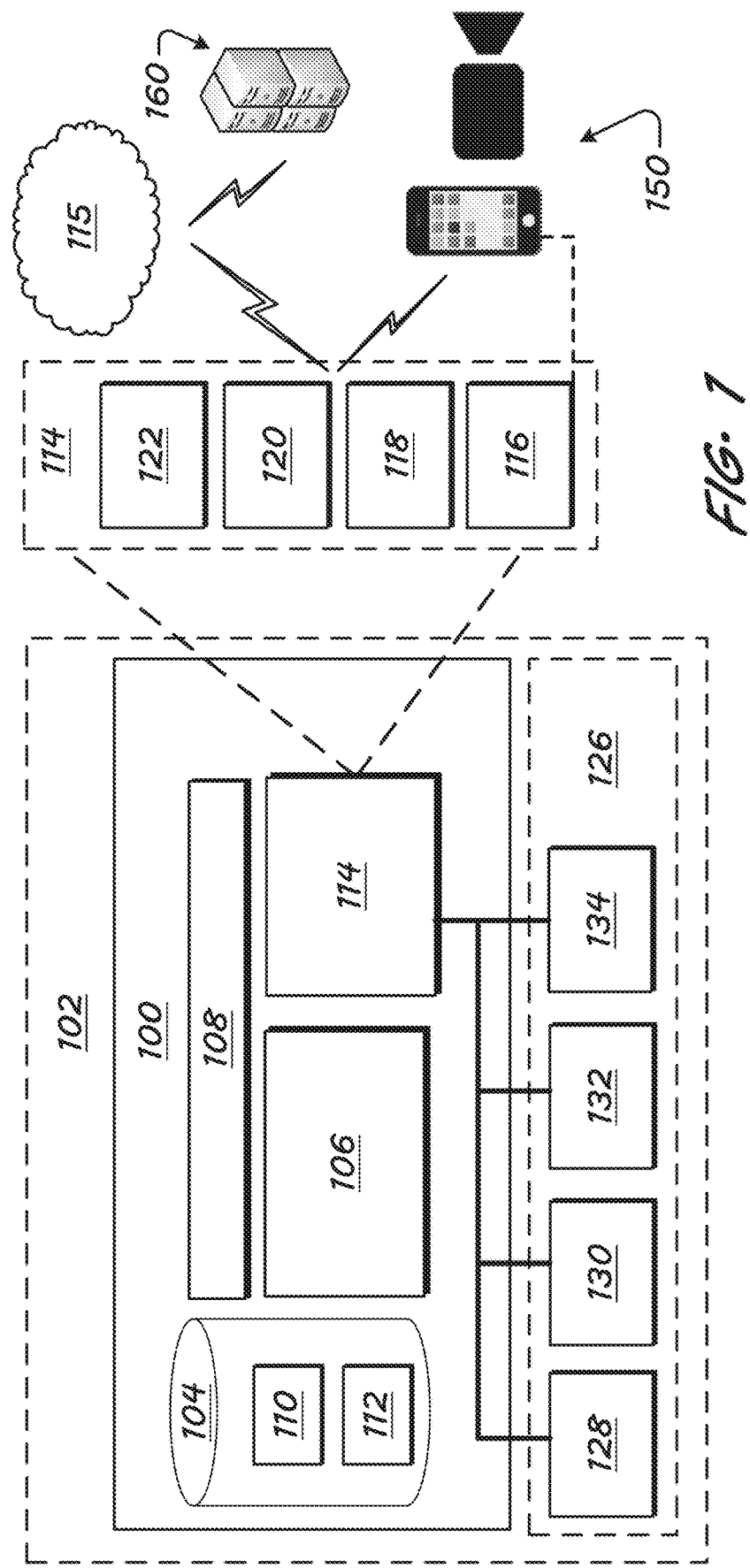
FIG. 1 illustrates schematically an example vehicle computer in communication with a mobile device.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. INTRODUCTION

The present technology by various embodiments leverages sensing capabilities of one or more mobile or otherwise connectable devices, such as a smart phone, at a vehicle such as an automobile, an aircraft, or marine craft.

A unique architecture incorporates capabilities of a plug-in or wireless sensor device into the vehicle. Benefits include but are not limited to improving vehicle performance of functions relying on sensor or sensor peripheral feedback, enhancing vehicle-user interaction, and/or enabling implementation at the vehicle of advanced computing applications requiring sensing capabilities that the vehicle would not have otherwise.

In various embodiments, a sensor peripheral, or sensing peripheral, of an add-on device, includes at least one sensor and associated hardware and/or software used in performance or output processing of the underlying sensor(s). While the term sensor is used mainly throughout regarding add-on device sensing capabilities, the references also incorporate embodiments in which a sensing peripheral is also used, or used instead of just sensor, unless stated otherwise.

The technology allows effective and relatively inexpensive incorporation of functionality of common, or known, sensors or sensor peripherals, and uncommon, or unknown, sensors or sensor peripherals, and without requiring changes to most or all basic on-board computer (OBC) features, such as the vehicle operating system (OS) and related drivers.

Add-on sensors or sensor peripherals can be provided by a smartphone or other off-the-shelf (OTS) devices. The add-on device can be arranged in the vehicle in any appropriate manner, such as being secured in a bracing apparatus (not shown) and facing forward through the windshield when a forward-viewing camera is the subject add-on device sensor.

While the present technology is described primarily herein in connection with automobiles, the technology is not limited by the focus. The concepts can be extended to a wide variety of applications, such as aircraft and marine craft, as mentioned, and any other computing apparatus that uses sensing technology and would benefit from upgraded sensing capabilities at relatively low cost, financially and in terms and time, labor, and materials.

II. ON-BOARD COMPUTING
ARCHITECTURE—FIRST EXAMPLE—FIG. 1

Turning now to the figures and more particularly the first figure, FIG. 1 illustrates a hardware-based computing or controlling apparatus 100. The controlling apparatus 100 can be referred to by other terms, such as computing apparatus, controller, controller apparatus, the like, or other.

The controller apparatus 100 is in various embodiments part of a greater system 102, such as a vehicle. The controller apparatus 100 can be, be a part of, include, or be in communication with an on-board computer (OBC), an electronic control unit (ECU), or other computing apparatus of the greater system 102—for example, a vehicle, such as an automobile.

The hardware-based controlling apparatus 100 includes a hardware-based computer-readable storage medium, or data storage device 104 and also includes a hardware-based processing unit 106 connected or connectable to the computer-readable storage device 104 by way of a communication link 108, such as a computer bus or wireless structures.

The hardware-based processing unit 106 can be referenced by other names, such as processor, processing hardware unit, the like, or other.

The hardware-based processing unit 106 can include or be multiple processors, which could include distributed processors or parallel processors in a single machine or multiple machines. The hardware-based processing unit 106 can be used in supporting a virtual processing environment.

The hardware-based processing unit 106 could include a state machine, application specific integrated circuit (ASIC), programmable gate array (PGA) including a Field PGA, or state machine. References herein to the hardware-based processing unit executing code or instructions to perform operations, acts, tasks, functions, steps, or the like, could include the hardware-based processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the hardware-based processing unit 106 to perform the functions of the hardware-based controlling apparatus 100 described herein.

The data storage device 104 in some embodiments also includes ancillary or supporting components 112, such as additional software and/or data supporting performance of the processes of the present disclosure, such as one or more user profiles or a group of default and/or user-set preferences.

The hardware-based controlling apparatus 100 also includes a communication sub-system 114 for communicating with one or more local and/or external networks 115, such as the Internet, or remote systems 160.

The communication sub-system 114 in various embodiments includes any of a wire-based transceiver 116, at least one long-range wireless transceiver 118, and one or more short- and/or medium-range wireless transceivers 120. Another port 122 is shown by way of example to emphasize that the system can be configured to accommodate one or more other types of wired or wireless communications.

The long-range transceiver 118 is in some embodiments configured to facilitate communications between the hardware-based controlling apparatus 100 and a satellite and/or a cellular telecommunications network, which can be considered also indicated schematically by reference numeral 115.

The short-range transceiver 120 is configured to facilitate short-range communications, such as communications with other vehicles, in vehicle-to-vehicle (V2V) communications, and communications with transportation system infrastructure (V2I).

To communicate V2V, V2I, or with other extra-vehicle devices, such as local communication routers, etc., the short-range communication transceiver 120 may be configured to communicate by way of one or more short-range communication protocols. Example protocols include Dedicated Short-Range Communications (DSRC), WI-FI®, BLUETOOTH®, infrared, infrared data association (IRDA), near-field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short- and/or long-range wireless communications, the hardware-based controlling apparatus 100 can, via the communication sub-system 114 and the processor 106, send and receive information, such as in the form of messages or packetized data, to and from the one or more communication networks 115.

External devices 150, 160 with which the sub-system 114 communicates are in various embodiments nearby, remote, or both.

External or extra-vehicle devices to which the hardware-based controlling apparatus 100 can communicate with, in performance of functions of the present technology, include one or more local add-on device 150, such as a user smartphone, or other local device having at least one relevant sensor or sensor peripheral configured to provide output that can be used by the vehicle 102, by existing vehicle functions and/or functions that the vehicle can perform using new software—e.g., applications—and the new sensor output.

An example vehicle function is autonomous driving, which can rely in part on vehicle-camera data, such as from a camera 128, shown schematically in FIG. 1. The vehicle 102 can, according to the present technology, use visual data from the add-on device 150 camera, in addition to or instead of the existing vehicle-camera data.

External or extra-vehicle devices can also include a remote system 160, such as a server (e.g., application server) or data, customer-service, and/or control center, which can be reachable by the indicated network(s) 115.

An example control center is the OnStar® control center, having facilities for interacting with vehicles and users, whether via the vehicle or otherwise (e.g., mobile phone) via long-range communications, such as satellite or cellular communications. ONSTAR is a registered trademark of the OnStar Corporation, which is a subsidiary of the General Motors Company.

The vehicle 102 also includes a sensor/peripheral sub-system 126 comprising sensors or sensor peripherals providing information to the hardware-based controlling apparatus 100 regarding items such as vehicle operations, vehicle position, vehicle pose, and/or the environment about the vehicle 102. The arrangement can be configured so that the hardware-based controlling apparatus 100 communicates with, or at least receives signals from sensors of the sensor sub-system 126, via wired or short-range wireless communication links 116, 120.

In various embodiments, the sensor sub-system 126 includes at least one camera 128 and at least one range sensor 130, such as radar. The camera 128 may include a monocular forward-looking camera, such as those used in lane-departure-warning (LDW) systems. Other embodiments may include other camera technologies, such as a stereo camera or a trifocal camera.

Such sensor sensing external conditions may be oriented in any of a variety of directions without departing from the scope of the present disclosure. For example, cameras 128 and radar 130 may be oriented at each, or a select, position of, for example, (i) facing forward from a front center point of the vehicle 102, (ii) facing rearward from a rear center point of the vehicle 102, (iii) facing laterally of the vehicle from a side position of the vehicle 102, and/or (iv) between these directions, and each at or toward any elevation.

Accordingly, the descriptions below, made primarily with respect to forward-facing sensors, may be applied with respect to rearward and/or side facing sensors, independently or in combination with forward-facing sensors.

The range sensor 130 may include a short-range radar (SRR), an ultrasonic sensor, a long-range RADAR, such as those used in autonomous or adaptive-cruise-control (ACC) systems, or a Light Detection And Ranging (LiDAR) sensor, for example.

Other sensor sub-systems include an inertial-momentum unit (IMU) 132, such as one having one or more accelerometers, and/or other such dynamic vehicle sensors 134, such as a wheel sensor or a sensor associated with a steering system (e.g., steering wheel) of the vehicle 102.

III. VEHICLE DATA STORAGE—FIRST EXAMPLE—FIG. 2

Figure 2:
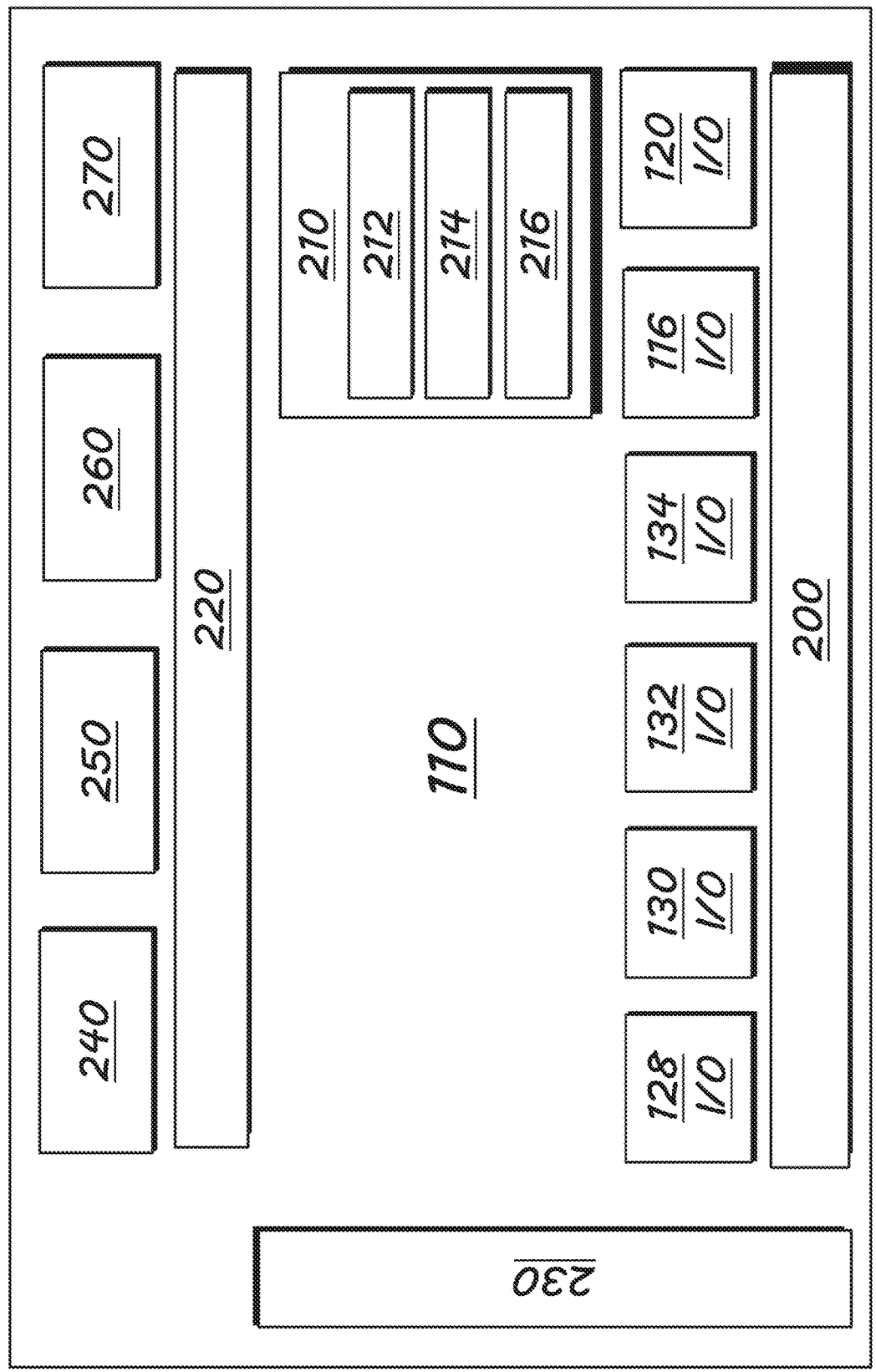
FIG. 2 shows example memory components of the computer architecture of FIG. 1.

FIG. 2 shows in more detail some of the features of the data storage device 104 of the vehicle 102 of FIG. 1.

As mentioned, instructions or code of the data storage device 104 can be arranged in one or more modules 110.

The data storage device 104 may also include ancillary components 112 (FIG. 1), such as additional software and/or data supporting performance of the processes of the present disclosure. The ancillary components can include, for example, additional software and/or data supporting performance of the processes of the present disclosure, such as one or more user profiles or a group of default and/or user-set preferences.

Any of the code or instructions described can be part of more than one module. And any functions described herein can be performed by execution of instructions in one or more modules, though the functions may be described primarily in connection with one module by way of primary example. Each of the modules or sub-modules thereof can be referred to by any of a variety of names, such as by a term or phrase indicative of its function.

As just an example, instructions configured to, via the hardware-based processing unit 106, obtain from an add-on device driver code for creating a virtual device driver at the vehicle 102, can be referred to as a driver-procurement module, or the like. As another example, instruction configured to obtain permissions from the operating system (200) of the vehicle 102 for using code at the virtual device driver created, can be referred to as a vehicle permissions module, or the like.

Some of the functions of the components of FIGS. 1 and 2 are provided in this section, and others below in connection with the diagram of FIG. 5 and algorithm of FIG. 6.

The code or modules 110 include an operating system 200, and multiple input and/or output components 116 I/O, 120 I/O, 128 I/O, 130 I/O, 132 I/O, and 134 I/O. The input/output components correspond to system ports for respective system inputs mentioned—116 (vehicle wired transceiver(s)), 120 (vehicle short or medium-range wireless transceiver(s)), 128 (vehicle camera(s)), 130 (vehicle range sensor(s)), 132 (vehicle IMU(s)), and 134 (vehicle dynamics sensor(s)).

The code 110 further includes a virtual input/output (I/O) service 210 comprising a vehicle-side client 212. The service 210 can be referred to as middleware.

The virtual I/O service 210 can further include or be in communication with a virtual input/output (I/O) device file 214 and a virtual input/output (I/O) device driver 216. The service, driver, and file 210, 216, 214 are referred to using the term virtual because they are used in presenting a virtual sensor, in that the actual, underlying, sensing sensor is not present at the vehicle; the service, driver, and file are not virtual, themselves. Similarly, other references to virtual, virtualizing, virtualized, or the like (e.g., virtualizing sensor data), does not indicate that the thing referred to is itself virtual (e.g., that the sensor data is, itself, virtual), but is referred to as such because it is associated with presenting a virtual sensor based on output from an actual, underlying, sensing sensor that is not present at the vehicle—e.g., not original to, or being added to after-market to the vehicle The virtual I/O service 210 is shown positioned adjacent the wired and wireless inputs/outputs 116, 120 because inputs/outputs to/from the service 210 would in various configurations be passed by those channels.

Code 110 components further include input/output (I/O) application program interfaces 220 (APIs) for various applications 240, 250, 260, 270 operating at the vehicle 102. While four applications are shown by way of example, the code 110 can include or be in communication with any number of applications that can benefit from operations of the present technology.

The code 110 also includes a control plane 230. The control plane 230 can perform functions such as initiating, arranging, orchestrating, and/or managing operations within the system 100, such as regarding actions and interactions at and between any of the operating system 200, input/outputs (e.g., 128, 130, etc.), features of the virtual i/o service 210, and input/output APIs 220. The initiated, arranged, orchestrated and/or managed operations can be referenced as operations of a data plane.

Particular control plane 230 functions can also in various embodiments be performed via communications with a permissions module (510, FIG. 5) of the code 110 and with an I/O capability-mapping module (530, FIG. 5) of the add-on device 150, as described further below regarding FIGS. 5 and 6.

IV. ADD-ON DEVICE—FIRST EXAMPLE—FIG. 3

Figure 3:
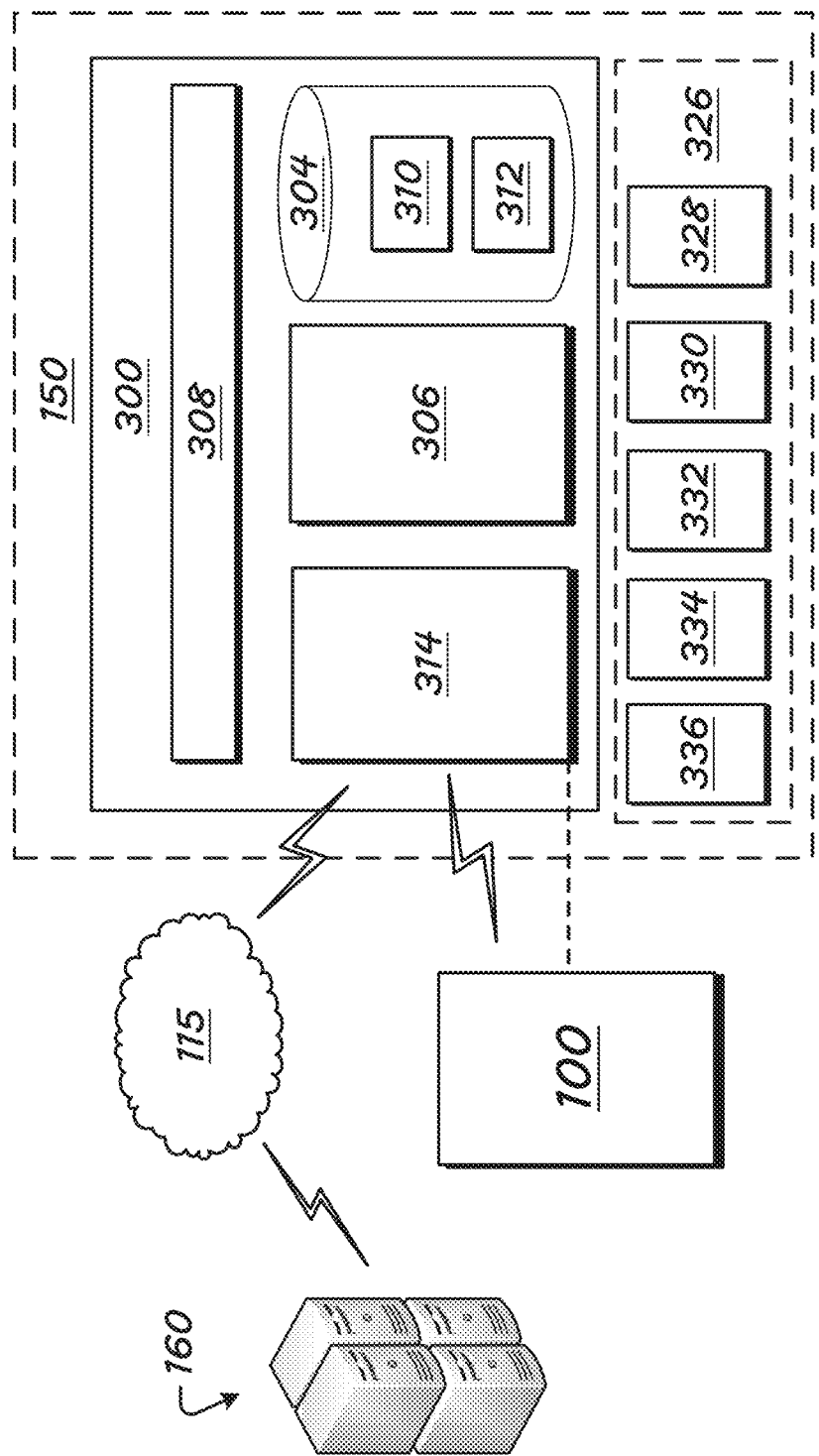
FIG. 3 shows schematically the example add-on device communicative with the vehicle computer in FIG. 1.

FIG. 3 illustrates schematically the example add-on device 150 shown in FIG. 1.

The add-on device 150 can be referred to by other terms, such as a user device, a local device, an add-on device, a plug-in device, an ancillary device, system, or apparatus. The term add-on device 150 is used primarily herein because the device 150 is not an original part of the greater system 102, such as an automobile, with which the device 150 is used.

The add-on device 150 includes a computing architecture or add-on computing system 300, including any of the features provided for the system 100 of FIG. 1, by way of example. The computing architecture 300 can be referred to by a variety of terms, such as hardware-based add-on controlling apparatus.

The add-on computing architecture 300 includes a hardware-based computer-readable storage medium, or data storage device 104 and also includes a hardware-based processing unit 306 connected or connectable to the computer-readable storage device 304 by way of a communication link 308, such as a computer bus or wireless structures.

The hardware-based processing unit 306 can be referenced by other names, such as processor, processing hardware unit, the like, or other.

The hardware-based processing unit 306 can be in any way like the unit 106 described above in connection with FIG. 1.

The data storage device 304 can be in any way like the device 104 described above in connection with FIG. 1. For example, the data storage device 304 can include one or more storage modules 310 storing computer-readable code or instructions executable by the hardware-based processing unit 306 to perform the functions of the hardware-based controlling apparatus 100 described herein.

The data storage device 304 in some embodiments also includes ancillary or supporting components 312, such as additional software and/or data supporting performance of the processes of the present disclosure, such as one or more user profiles or a group of default and/or user-set preferences.

The add-on device architecture 300 also includes a communication sub-system 314 for communicating with the first computing system 100—such as by wired or wireless connections, one or more local or external networks 115, such as the Internet, or remote systems 160.

The communication sub-system 314 in various embodiments includes any of a wire-based transceiver or port, at least one long-range wireless transceiver, and one or more short- and/or medium-range wireless transceivers. The wired port can include, for instance, a universal-serial-bus (USB) port.

The long-range transceiver is in some embodiments configured to facilitate communications between the add-on computing device 300 and a satellite and/or a cellular telecommunications network, which can be considered also indicated schematically by reference numeral 115.

The short-range transceiver is configured to facilitate short-range communications, such as communications with other nearby wireless devices, systems, or networks.

Example communication protocols include Dedicated Short-Range Communications (DSRC), WI-FI®, BLUETOOTH®, infrared, infrared data association (IRDA), near field communications (NFC), the like, or improvements thereof.

By short- and/or long-range wireless communications, the add-on computing device 300 can, via the communication sub-system 314 and the processor 306, send and receive information, such as in the form of messages or packetized data, to and from the one or more communication networks 115.

The add-on device 150 also includes a sensor sub-system 326 comprising sensors providing information to the add-on computing device 300, such as about an environment of the add-on device 150.

The arrangement can be configured so that the add-on controlling apparatus 300 communicates with, or at least receives signals from sensors of the sensor sub-system 326, via wired or short-range wireless communication links.

Original vehicle sensors are generally domain-specific for a vehicle function and therein configured and arranged for a specific purpose by having robust calibration and customization for the function. New applications being developed for vehicles continuously, though, require or would benefit from one or more sensing capabilities that a vehicle may not already have.

Add-on devices 150 such as smartphones and OTS devices could have the required or preferred sensors, or sensors having better characteristics over sensors that the vehicle is originally equipped with, lending to improved performance of the new application. Add-on device sensors could have higher resolution or accuracy, for instance.

In various embodiments, the add-on device sensor subsystem 326 includes at least one camera 328, such as a three-dimensional (3D) camera or peripheral, or peripheral system, and at least one microphone 330. Another example sensor is an inertial-momentum unit (IMU) 332, such as one having one or more (e.g., 3D accelerometers). Another example sensor is a barometer, or barometric sensor 334.

Another icon 336 is provided to indicate one or more other sensors that the add-on device 150 can include. Other example sensors include a geo-location receiver, a gyroscope sensor, an altimeter, other accelerators, magnetometer, proximity, light sensor, touch sensor, NFC or other wireless transceiver/detector, and a biometric sensor, —e.g., voice recognition, finger or thumb-print recognition, breathalyzer, and facial, retina or other recognition sensors.

V. ADD-ON DEVICE DATA STORAGE—FIRST EXAMPLE—FIG. 4

Figure 4:
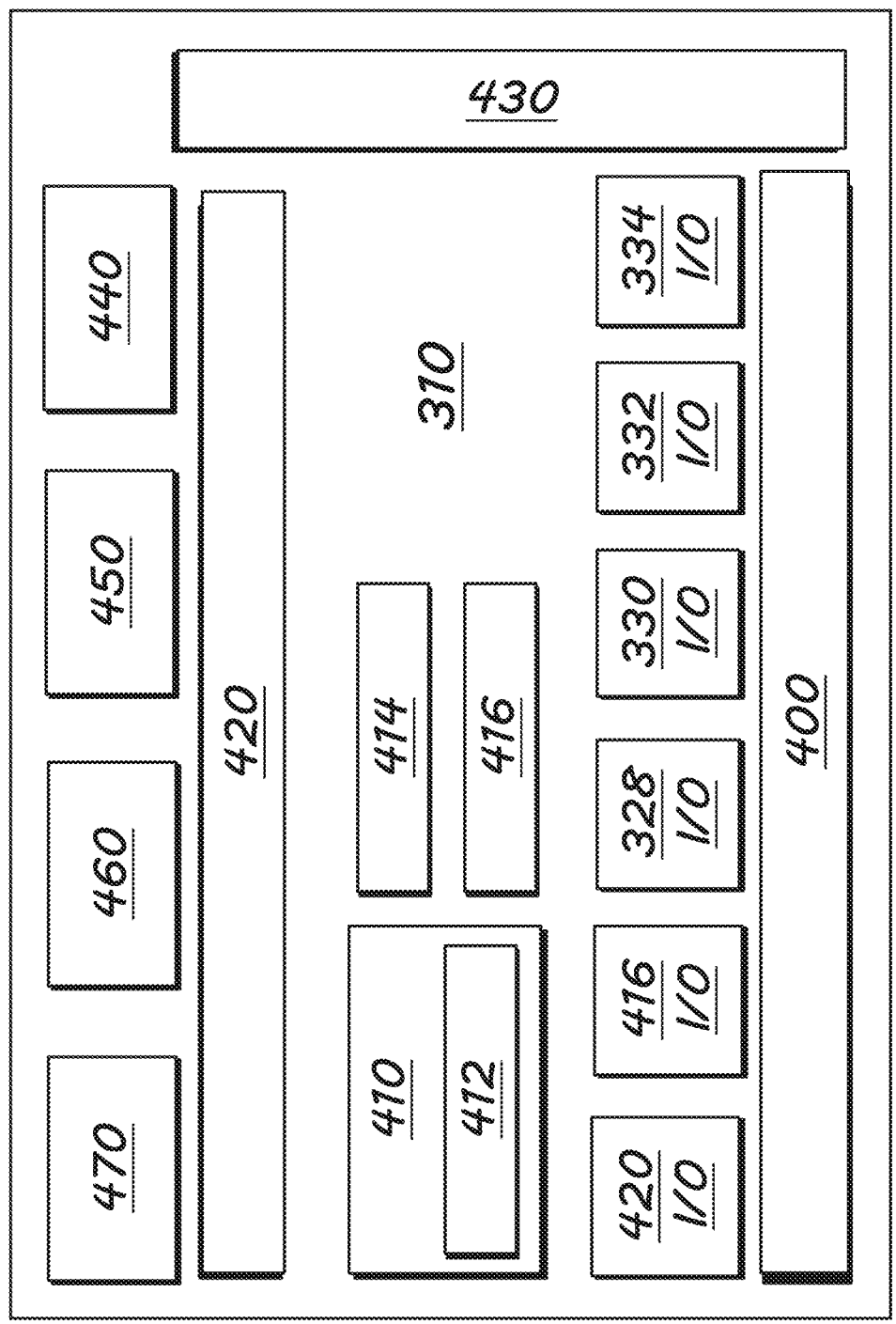
FIG. 4 shows example memory components of the architecture of FIG. 3

FIG. 4 shows in more detail some of the features of the data storage device 304 of the add-on device 150 of FIG. 3.

As mentioned, instructions or code of the data storage device 304 can be arranged in one or more modules 310. The data storage device 304 may also include ancillary components 312 (FIG. 3), such as additional software and/or data supporting performance of the processes of the present disclosure. The ancillary components can include, for example, additional software and/or data supporting performance of the processes of the present disclosure, such as one or more user profiles or a group of default and/or user-set preferences.

As with the vehicle code, any of the code or instructions of the add-on device 150 described can be part of more than one module. And any functions described herein can be performed by execution of instructions in one or more modules, though the functions may be described primarily in connection with one module by way of primary example. Each of the modules or sub-modules thereof can be referred to by any of a variety of names, such as by a term or phrase indicative of its function.

As just an example, instructions configured to, via the hardware-based processing unit 306, send to the vehicle processing unit 106 a device driver code for creating a virtual device driver at the vehicle 102, can be referred to as a driver-processing module, or the like. As another example, instruction configured to obtain permissions from the operating system (400) of the add-on device 150 for using code at the virtual device driver created, can be referred to as an add-on device permissions module, or the like.

Some of the functions of the components of FIGS. 1-4 are provided in this section, and others below in connection with the diagram of FIG. 5 and algorithm of FIG. 6.

The code or modules 310 include an operating system 400, and multiple input and/or output components 328 I/O, 330 I/O, 332 I/O, 334 I/O, etc.

The input/output components correspond to system ports for respective system inputs mentioned—416 (add-on device wired transceiver(s), associated with communication sub-system 314), 420 (add-on device short or medium-range wireless transceiver(s), associated with communication sub-system 314), 328 (add-on device camera(s)), 330 (add-on device microphone), 332 (add-on device IMU(s)), and 334 (add-on device barometer).

The code 310 further includes a virtual input/output (I/O) service 310 comprising at least an add-on device-side server 412 corresponding to the virtual I/O service client 212 of the vehicle 102. The virtual I/O service 210 is in various embodiments in communication with an input/output (I/O) device file 414 and an input/output (I/O) device driver 416.

The virtual I/O service 410 is shown positioned adjacent the wired and wireless inputs/outputs 416, 420 because inputs/outputs to/from the service 410 would in various configurations be passed by those channels.

Code 310 components further include input/output (I/O) application program interfaces 420 (APIs) for various applications 440, 450, 460, 470 operating at the add-on device 150. While four applications are shown by way of example, the code 310 can include or be in communication with any number of applications that can benefit from operations of the present technology.

The code 310 also includes a control plane 430. The control plane 430 can perform functions such as initiating, arranging, orchestrating, and/or managing operations within the system 300 (FIG. 3) using the code 310, such as regarding actions and interactions at and between any of the controlling apparatus 300, input/outputs (e.g., 328, 330, etc.), features of the virtual i/o service 410, and input/output APIs 420. Particular control plane 430 functions can also in various embodiments be performed via communications with a permissions module (520, FIG. 5) of the code 310 and with the I/O capability-mapping module (530, FIG. 5) of the add-on device 150, as described further below regarding FIGS. 5 and 6. The initiated, arranged, orchestrated and/or managed operations can be referenced as operations of a data plane.

VI. VARIOUS COMPONENTS AND INTERRELATIONS—FIRST EXAMPLE—FIG. 5

Figure 5:
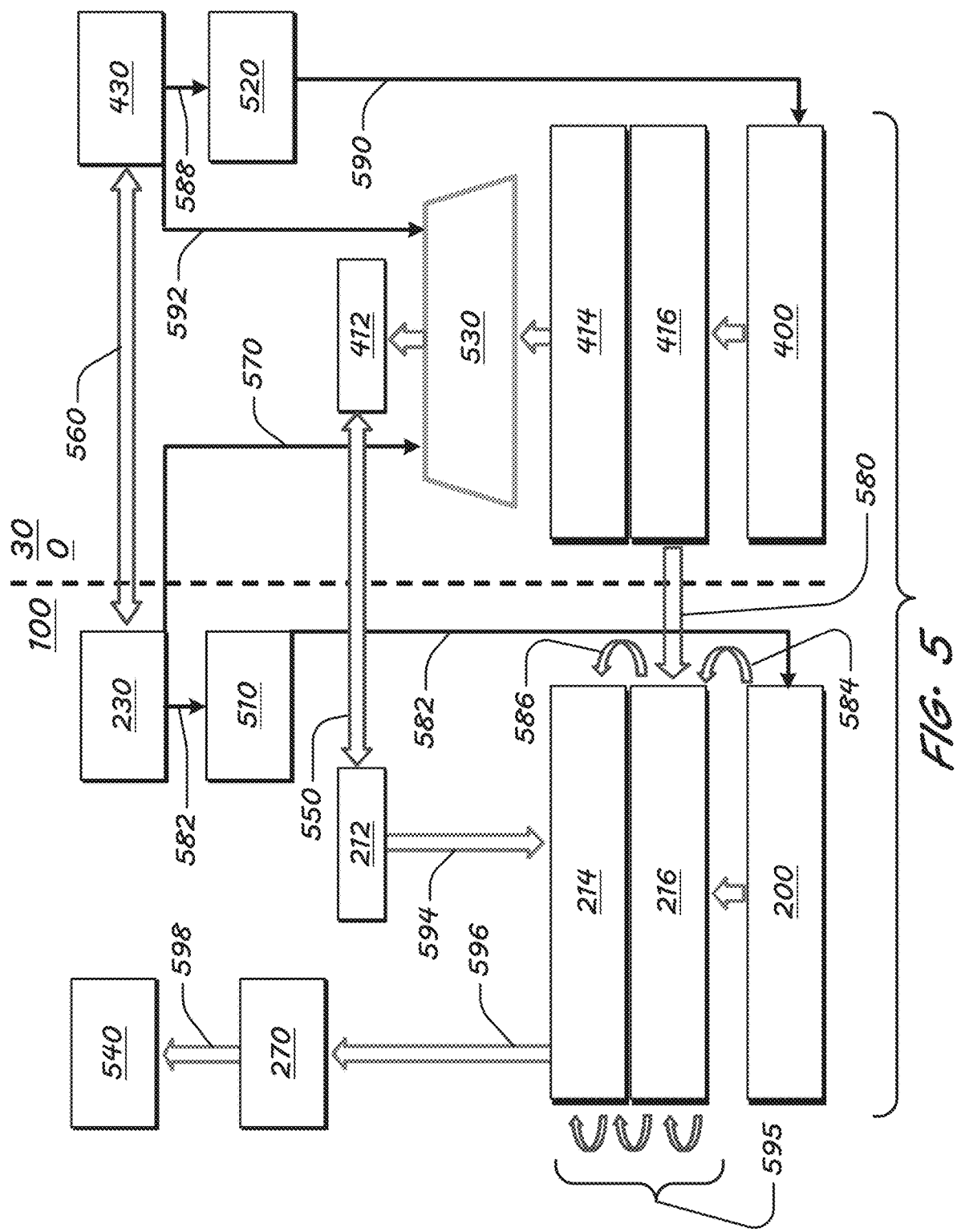
FIG. 5 shows select components and communications of the computers of FIGS. 1 and 3.

FIG. 5 shows select components of the vehicle 102 and the add-on device 150 of FIGS. 1-4, and example intra- and inter-device or system communications.

Most of the components of FIG. 5 are afore-described, regarding FIGS. 1-4. The components include the permission modules 510, 520, referenced above, regarding the vehicle computing system 100 and the add-on device 150 computing systems, respectively.

The components also include the mentioned input/output (I/O) capability-mapping module 530 of the add-on-device computing system 300.

The vehicle 102 also includes one or more receiving apparatus 540, or communication interface, such as a vehicle-user interface—e.g., heads-up display (HUD) or other screen, a vehicle speaker, a vehicle autonomous driving system, a vehicle HVAC system, or a communication transceiver for sending a message to a remote device such as a remote customer-service (e.g., OnStar®) server or computer system. The apparatus 540 receives output from an application 270, which is using the virtual I/O data obtained by the virtual-service client 212 from the virtual-service server 412 of the add-on device 150. While a single icon 270 is shown in FIG. 5 regarding applications using the present arrangement, as with all aspects shown, more than one application can use the technology at a time. And while a single icon 540 is shown, as with all features shown, more than one receiving apparatus can be implemented.

In various embodiments, the present architecture is further configured and arranged so that input provided to the interface 540 is received and processed in the system 100 to affect system operations.

In various contemplated embodiments, application output of the application 270 is not limited to output for receipt by the user (e.g., visual or audio), but can include communications to the vehicle 120, such as a message or data package affecting vehicle operations, such as autonomous driving or HVAC settings, and can include communications to a remote system 160, such as an OnStar® server.

Other functions, and communication channels indicated (e.g., 550, etc.), are described further below in connection with the algorithm 600 of FIG. 6.

VII. ALGORITHMS—FIRST EXAMPLES—FIGS. 6 AND 7

Figure 6:
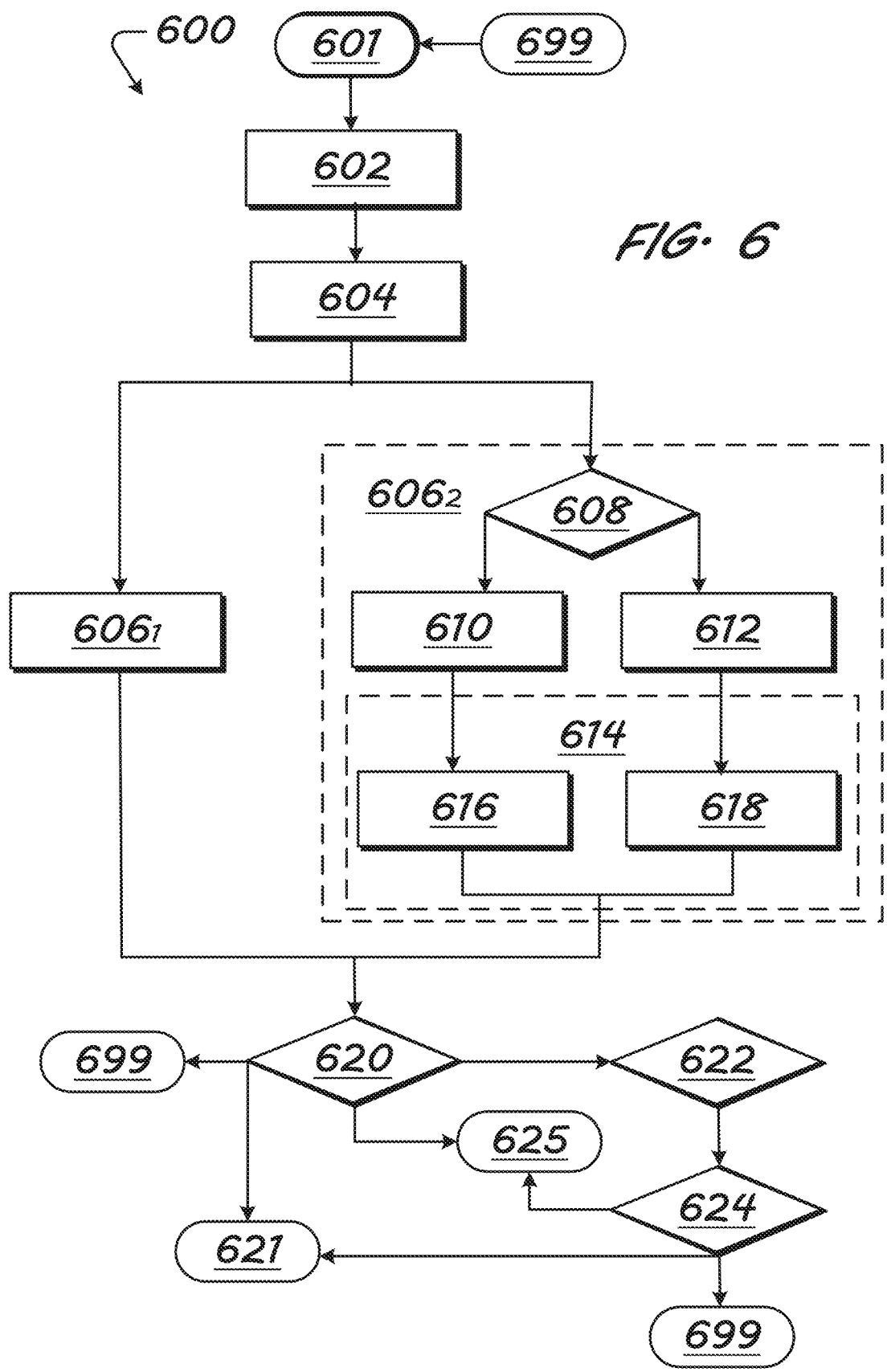
FIG. 6 shows a first exemplary algorithm in the form of a process flow, for performing first functions, for establishing a virtualizing infrastructure.
Figure 7:
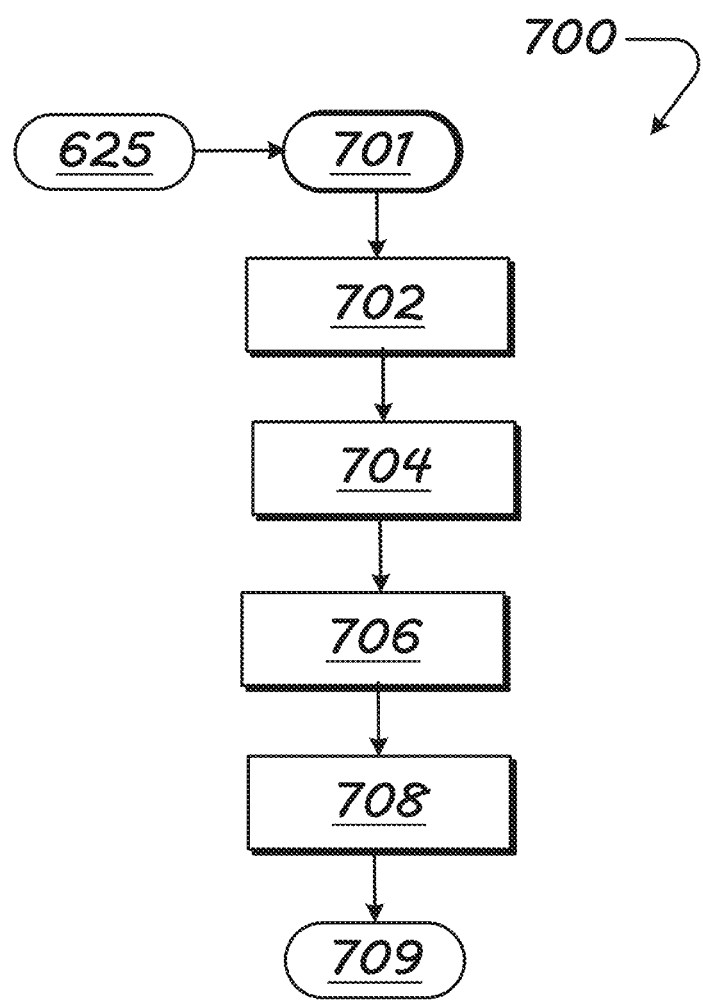
FIG. 7 shows a second exemplary algorithm for performing second, sensor-virtualization, functions.

FIGS. 6 and 7 show example algorithms, represented schematically by a process flows 600, 700 for creating and using virtual sensor(s) input at the vehicle 102 based on sensor input from the add-on device 150, according to embodiments of the present technology.

More particularly, FIG. 6 shows a first exemplary algorithm 600 in the form of a process flow, for performing first functions, for establishing a virtualizing infrastructure.

And FIG. 7 shows a second exemplary algorithm 700 for performing second, sensor-virtualization, functions.

In various embodiments, functions of FIG. 6 or 7 can be referred to as virtualizing and/or docking the subject sensor(s) of the add-on device. This in various cases can include accommodating common, or known, sensors and less common or unknown sensors, heretofore not recognized by vehicle code. In various embodiments, the vehicle system 100 is preconfigured with code relating to certain sensors, even if the code is dormant or not used when the vehicle is originally made and put into operation. These sensors can be referred to as common or known sensors. Other sensors, that the vehicle system 100 would not recognize, due to not having pre-established code relating to such sensors, can be referred to as uncommon, or unknown sensors.

It should be understood that the steps, operations, or functions of the algorithms 600, 700 are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated algorithms 600, 700 can be ended at any time.

In certain embodiments, some or all operations of the algorithms 600, 700 and/or substantially equivalent operations are performed by a processor, e.g., computer processor, executing computer-executable instructions stored or included on a computer-readable medium, such as one or both of the data storage devices 104, 304 of the systems 100, 300, or similar features that can be present at a remote server or computer system 160, described above.

VII.A. Algorithm of FIG. 6

The algorithms 600 begins 601 and flow proceeds to block 602, whereat physical connection 550 is established between the hardware-based processing unit 106 of the vehicle 102 and the hardware-based processing unit 306 of the add-on device 150. The connection can be accomplished by wired and/or wireless channels, as referenced above.

At block 604, the vehicle processing unit 106 and the add-on-device processing unit 306 establish a communication channel or channels, for later communications and data transfer between the systems 100, 300—e.g., inter-system communications shown at references 550, 560, 570, 580.

Establishment the communication channel(s) can include a handshake or other introduction or negotiation process. By way of the establishment, the computing systems 100, 300 can dynamically set parameters of one or more communication channels between them, for example.

At routines 606 ($606^1$, $602^2$), any needed and not-present add-on device 150 and vehicle 102 components are provisioned, obtained, or provided.

At block $606^1$, the add-on-device-side server 412 and an I/O capability-mapping module 530 are formed.

In various embodiments, the add-on device 150 is specially pre-configured to include the server 412, such as in contemplation of the mating and functions of the present technology. An original equipment manufacturer (OEM) of the vehicle 102 can manufacture or approve such a specially-configured add-on device 150.

The add-on device 150 is also in various embodiments pre-configured with an I/O device file 414 and I/O device driver 416. In the example of a smartphone, for instance, the phone would also have I/O device files and drivers for use in processing output from phone cameras, microphones, IMUs, barometers, and any other phone sensors 328, 330, 332, 334, 336.

By way of example and not limitation, the server 412 and I/O capability-mapping module 530 can be formed by a software update or upgrade received at the add-on device 150 from the remote system 160.

In a contemplated embodiment, the server 412 and I/O capability-mapping module 530 are formed by a software upgrade or update received at the add-on device from the vehicle system 100, such as by way of an application operating at the vehicle system 100, configured in association with the present technology.

In another contemplated embodiment, the server 412 and I/O capability-mapping module 530 are part of an application loaded to the system 300, or are formed by operation of an application loaded to the system 300.

At sub-routine 606², the vehicle-side client 212, and associated virtual I/O service features, including the virtual I/O device file 214 and virtual I/O device driver 216, are created. By way of example and not limitation, the client 212 and I/O structures 214 216 can be formed by a software update or upgrade received from the remote system 160.

At decision diamond 608, of the sub-routine 606, the vehicle processing unit 106 determines whether the vehicle system 100, such as in the operating system 200, includes code, or a basis for rendering code, that can be used to form the virtual I/O device file and driver 214, 216. The operation can include obtaining sensor data indicating a type of sensor of the add-on device 150 to be virtualized at the vehicle system 100. The data can be received from the add-on device 150, or an application running at the vehicle system 100, as examples.

The operating system 200 may have been pre-configured with such pre-existing or dormant code for such purposes. The OEM may have anticipated that an after-market solution, such as retrofit of a common sensor that the vehicle is not equipment originally with, may be provided, and so provided corresponding code. Or the OEM may make certain levels of a vehicle with or without various sensor packages, and decide to leave code, or pre-code, corresponding to included and non-included sensors in all vehicles.

The pre-existing code is more likely to be present, then, in regards to common, or known, sensors. Examples in some embodiments include a simple camera sensor, which can point forward and fill a forward-camera setting in the vehicle system 100 (e.g., dormant code set up for a forward-camera), thought the vehicle is not equipped originally with a forward camera.

As a specific example, an OEM may have provided the operating system or other data structure of the vehicle system 100 with code, or basis for code, corresponding to a front-view camera, though the vehicle 102 was originally equipped with only a rear-view camera, in anticipation of the after-market solution provided by the virtual-front-camera arrangement of the present technology, or a more-expensive actual-vehicle-front-camera after-market solution.

The control plane 230 can orchestrate the decision process including communication with the operating system 200 as indicted by communication path 582 in FIG. 5.

If the vehicle system 100 is found in the decision 608 to include the relevant code or pre-code, flow proceeds to block 610, whereat the virtual I/O device file and/or driver 214, 216 are formed at the vehicle system 100 by the processing unit 106 based on the pre-existing code determined present at the vehicle system 100. The control plane 230 can orchestrate the set-up, such as by communications 582 with the operating system 200.

Relevant functions are indicated by communication paths 584, 586 showing push of relevant code from the source (e.g., operating system 200) to form the virtual I/O device driver and file 216, 214.

In a contemplated embodiment, forming the client 212 and I/O device structures 214 216 is performed in response to a software upgrade or update received at the vehicle system 100 from the add-on device 150, such as by way of an application, configured in association with the present technology, received and operating at the add-on device 150.

If the vehicle system 100 is found in the decision 608 to not include the relevant code or pre-code, flow proceeds to block 612. As provided, the pre-existing code is less likely to be present for less-common, or unknown, sensors, such as may be the case with a barometer or barometric sensor, or other new and high-quality sensor of the add-on device 150.

At block 612, the processing unit 106 of the vehicle system 100 initiates or otherwise performs communication with the add-on device 150, for obtaining code relevant to forming the virtual I/O device file and driver 214, 216, such as via the channel shown schematically at reference numerals 550, 560 and/or 570. The control plane 230 can perform or manage the communications, by communicating with the control plane 430 of the add-on device 150 and/or other components of the add-on device 150, such as the I/O capability-mapping module 530.

As mentioned, the add-on device 150 typically would inherently have the device driver and file 416, 416, and accompanying code.

Transfer of the relevant driver and/or file code is indicated schematically by reference numeral 580. The transfer can form or be used to form the virtual I/O device driver 216, and the formation can also be considered indicated by the numeral 580.

A function of creating the virtual I/O device file can be performed based on the created virtual I/O device driver. File formation can be indicated by numeral 586.

As mentioned, in a contemplated embodiment, forming the client 212 and I/O device structures 214 216 is performed in response to a software upgrade or update received at the vehicle system 100 from the add-on device 150, such as by way of an application, configured in association with the present technology, received and operating at the add-on device 150.

At block 614, the processing unit 106 of the vehicle system 100 determines whether permission(s) exist or are sufficient to use the sensor-output from the add-on-device sensor(s) 328-336.

When the operation 614 results from block 610, the particular act 616 of obtaining permission(s) is expected to be, or will typically be, a relatively simple process, because the vehicle system 100 already had the underlying code obtained, or actuated, at block 610. The system 100 is thus pre-programmed to allow use of the contemplated sensor input being provided by the virtual arrangement—even if the contemplated sensor input was only expected to be via an more-expensive new actual-sensor input.

In the act 616, the processing unit 106 of the vehicle 102 in various embodiments executes control plane 230 functions, and leverages the mentioned permissions module 510 of the vehicle 102. The permissions module 510 can pre-exist at the vehicle 102, or be created or modified in the earlier-mentioned set-up operations (e.g., 606).

By way of examples, communications to check permissions are indicated by reference numerals 586, 582.

When the operation 614 results from block 612, the particular act 618 of obtaining permission(s) is expected to be a more-involved routine as compared with that of block 616. In various embodiments, the more-involved routine includes communications with the computer system 300 of the add-on device 150.

In the act 616, the processing unit 106 of the vehicle 102 in various embodiments executes control plane 230 functions, and leverages the mentioned permissions module 510 of the vehicle 102. The operations can also include the unit 106 communicating, via the processing unit 306 of the add-on device 150, such as with the control plane 430 of the add-on device 150, as indicated by path 560.

The processing unit 306, via the control plane 430, and in some cases a permissions module 520, of the add-on device 150, obtain instructions or data from storage of the computing system 300, such as from the operating system 400, that can be used to determine whether sufficient permission exists to use the sensor data from the add-on device for the virtual sensor arrangement at the vehicle 102.

By way of examples, paths for communications to check permissions are indicated by reference numerals 560, 588, 590, 592.

At diamond 620, capability of the add-on device 150, or particularly of the add-on device 150 with respect to providing subject add-on device sensor data, is analyzed to determine whether there is an appropriate match between the parameters by which the add-on device 150 provides sensor data and vehicle-system 100 configuration.

The consideration is in various embodiments performed by communications between the processing units 106, 306, by way of the respective control planes 230, 430. One or both planes 230, 430 can communicate with the I/O capability-mapping module 530, as indicated by paths 570, 592.

The decision 620 can include any of a wide variety of considerations without departing from the present disclosure. As examples, the decision can consider whether the speed or rate (e.g., sampling rate) by which add-on-device sensor data is output matches processing speeds, needs, or expectations at the vehicle system 100. Other example characteristics include latency, data-sensing accuracy, data format, and any other quality-of-service (QoS) parameters.

If at decision 620, the capabilities of the add-on device 150, or at least of the add-on device 150 as it pertains to output to the vehicle from a subject add-on-device sensor (e.g., smartphone barometer or camera), are determined insufficient (e.g., one or more critical aspects are insufficient), then the process can end 621, or be repeated 699 in connection with a different sensor of the add-on device 150, or with a different add-on device altogether. This result would follow because the vehicle system 100 is programmed with required parameters required for various functions. The data must be readable or recognizable, such as by being of a certain type. The data must be reliable and timely, such as by being received at rates and reliability or consistently over time appropriate to the level of importance—e.g., criticality—of the use at the vehicle 120. Virtual sensor data for use in autonomous driving must be sampled at a relatively high rate and received with relatively little latency, for instance, to be relied upon at the vehicle 102.

If at decision 620, the capabilities of the add-on device 150, or at least of the add-on device 150 as it pertains to output to the vehicle from the subject add-on-device sensor (e.g., smartphone barometer or camera), are determined in any aspect to be over-qualified, such as by too high of a sampling rate or too low of a latency, then flow proceeds to diamond 622 whereat the processing unit 106 of the vehicle system 100 communications (e.g., negotiates) with the processing unit 306 of the add-on device 150 to determine whether the add-on device 150 can degrade servers—e.g., deliver the subject sensor data with stated lower, target level(s) for the relevant aspect(s).

If at diamond 622 the vehicle system 100 determines that the add-on system cannot provide the subject sensor data with the target level(s) for the relevant aspect(s), flow could proceed to a contemplated decision operations 624 whereat the vehicle system 102 determines whether it is willing to operate above the target level.

If offending the target level only results in additional power usage, the vehicle system 102 can be programmed to at the operation 624 determine that the shortcoming can be overlooked, or at least overlooked dynamically, or adaptively, under certain circumstances, such as when a battery level at an electric vehicle 102 is above 50%, or battery level and expected trip or time to next charge, met pre-set criteria. As another example, the vehicle system 100 may be programmed so that, if offending a target capability level would result in use of additional memory, CPU processing, or wireless bandwidth usage at the system 100, the offense can be overlooked, or overlooked dynamically, such as when memory, CPU processing, or wireless bandwidth usage is sufficient or expected to be sufficient.

If offending the target is determine at operation 624 to be unacceptable, then the process can end 621, or be repeated 699 in connection with a different sensor of the add-on device 150, or with a different add-on device altogether.

If at decision 620, capabilities of the add-on device 150, or at least of the add-on device 150 as it pertains to output to the vehicle from the subject add-on-device sensor (e.g., smartphone barometer or camera), are determined to be satisfactory, or any parameter offending at target level is determined to be satisfactory, at least under present circumstances, at operation 624, flow proceeds to transition oval 625, leading to FIG. 7.

VII.B. Algorithm of FIG. 7

From transition oval 625 of FIG. 6, flow of the algorithm 700 of FIG. 7 begins 701.

Flow proceeds to block 702 where at sensor data is obtained by the vehicle system 100 from the add-on device 150. The operation 702 can include the vehicle system 100 requesting the data, such as in accord with a need communicated by the subject vehicle-side application(s) 270. Such request can be considered indicated by rightward flow at numeral 550 in FIG. 5.

The vehicle-system 100 processing unit 106 receives the data from the add-on-device-side server 412 by way of the vehicle-side client 212. The data path is indicated by leftward flow at numeral 550 in FIG. 5.

At block 704 the vehicle system 100 process the received sensor data using the virtual structures described. The operation 704 can be referred to as virtualizing the received sensor data. The operation 704 includes processing the received sensor data using the corresponding virtual I/O device driver and file 216, 214. In various embodiments, the processing results in data processed that can be presented the sensor data to the subject application 270 in the same, or substantially the same, manner (format, timing, etc.) that the application 270 would expect to receive such sensor data from an at-vehicle sensor (e.g., barometer), if the vehicle were equipped with such sensor (e.g., barometer).

The operations 704 include communications between the client and virtual I/O device file and/or driver 214, 216, as indicated schematically by path numeral 594 in FIG. 5, and functions performed at the virtual I/O device file and/or driver 214, 216, as indicated by numeral 595 in FIG. 5.

The operations 704 can include, for instance, open, read, configure, write, set, map, and callback functions, such as the following:

open (fd, permission)
read (buf, size);
write (buf, size);
configure (stat, $val_c$)
set (par, $val_s$);
mmap (fd, mem); and
callback (func(val));

wherein:
fd parameter is a file descriptor that indicates (virtual) I/O device file;
permission refers to an access and read/write right to this I/O device file;
buf indicates the address of the buffer used to contain the read and/or write operations;
size is the size of the buffer;
par is the particular parameter that needs to be set;
$val_s$ is a value of the setting (e.g., finite integer(s) or float numbers, such as 1, 5 or 30 fps, etc.);
$val_c$ is a value of the configuration (e.g., finite string(s), such as "running", "sleeping", or "resetting", etc.); and
mem refers to a memory page.

At block 706, the processed or virtualized sensor data is delivered to the subject application(s) 270. The path is shown by reference numeral 596 in FIG. 5.

At block 708, the application 270 uses the processed or virtualized sensor data, such as barometer data or camera data, in operations of the application 270, as if the sensor data originated form a vehicle sensor configured and arranged to provide the same data.

Figure 8:
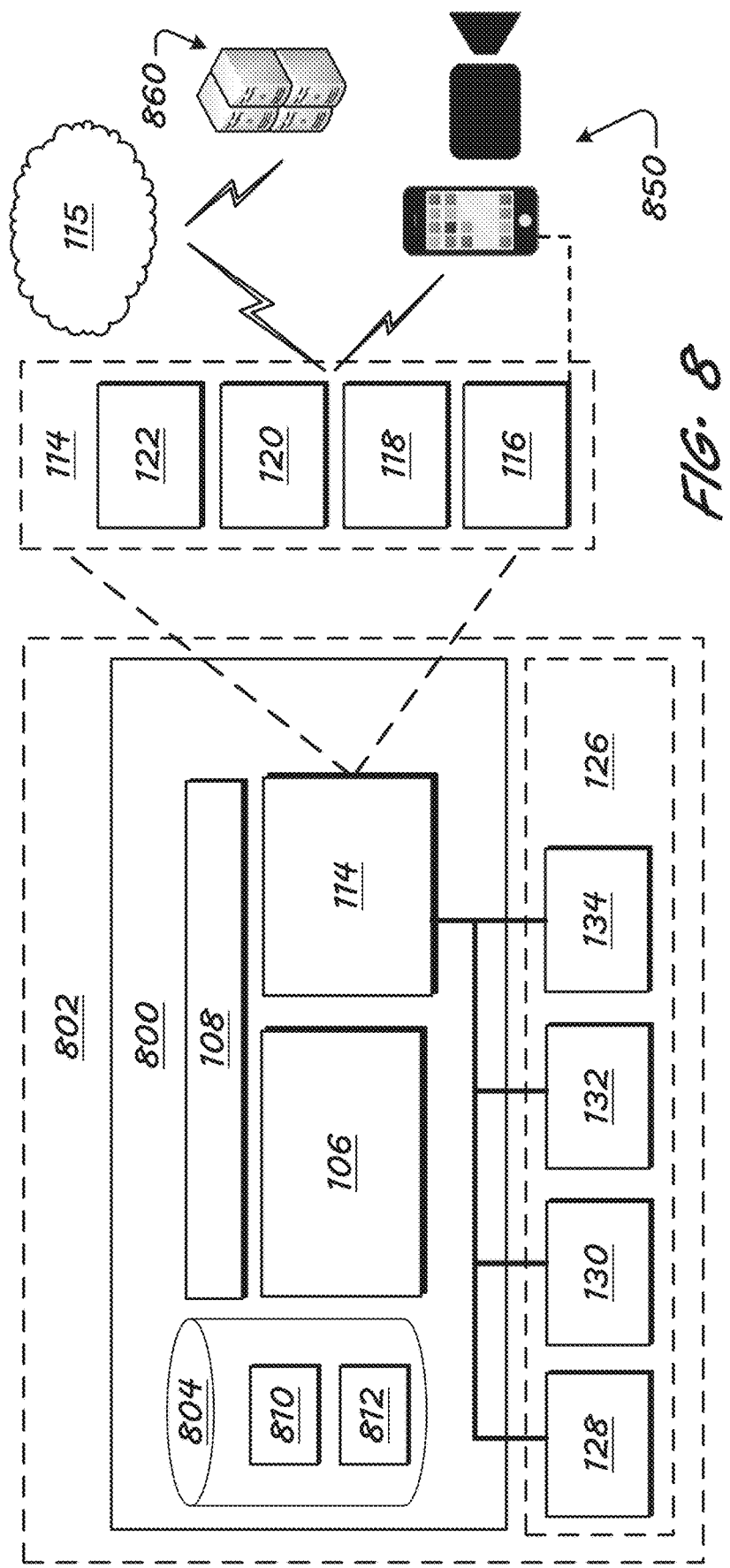
FIG. 8 illustrates a hardware-based computing or controlling apparatus, according to another embodiment.

The operation 708 can include delivery of application output, indicated by path 598 in FIG. 8, to a receiving apparatus 540, or communication interface, such as a vehicle-user interface—e.g., heads-up display (HUD) or other screen, a vehicle speaker, a vehicle autonomous driving system, a vehicle HVAC system, or a communication transceiver for sending a message to a remote device such as a remote customer-service (e.g., OnStar®) server or computer system.

The process 700 can end 709 or be repeated.

VIII. BAROMETER OR ALTIMETER USE CASE

As referenced above, along with other example use cases, such as using cameras and biometric sensors, add-on-device barometric sensor or barometric altimeters, could be leveraged at the vehicle 102 according to the present technology.

Applications using barometric data can perform functions including estimating road grade and creating or revising map data regarding elevation or altitude. The map data created or updated can be stored at the vehicle 102, at the add-on device 150 (e.g., smartphone), and/or remotely, such as a remote computing or server system 160. The remote system could use barometer or altimeter output from numerous devices over time to improve map data, effectively crowd-sourcing a function that would otherwise require expensive professional survey work.

Road grade estimation can be valuable in vehicle operations such as powertrain-, or propulsion-, efficiency optimization and autonomous driving functions. Applications focused on these functions could use a virtual sensor, virtualizing a sensor the vehicle 102 doesn't already have, or virtualizing a sensor that is in one or more ways (e.g., accuracy) more advanced than a corresponding vehicle sensor.

Regarding propulsion-efficiency optimization, for instance, an application may be programmed to control vehicle functions, such as speed and acceleration as a function of present and imminent road grade. The functions require accurate road grade data, which is not always available in existing map data (e.g., satellite map data) or from an existing vehicle sensor.

Even for vehicles having a barometer, resolution or accuracy tends to be in the realm of about 100 Pa. Barometric sensors of modern smartphones are much more accurate, some having accuracy of about 1 Pa, or better.

In one embodiment, the vehicle system 100 is programmed with an equation [Eqn. 1] using barometric pressure readings from the add-on device 150. The equation can be part of an application added to, or original to, the vehicle 102. The equation shown is an example and can be altered as desired, and/or another equation using barometer output can be implemented at the vehicle 102.

$$\operatorname{Sin}\beta(t) = \frac{18400\left(1 + \frac{a}{273}\right)\log\frac{P_2(t + \Delta t)}{P_1(t)}}{\tilde{V} \cdot \Delta t} \quad \text{[Eqn. 1]}$$

wherein:
β(t) represents road grade angle, of the road segment, as a function of time (t) as a vehicle travels through the segment;
a is a constant, used in barometer-estimated altitude measure;
$P_1$ is barometer measurement at time t;
$P_2$ is barometer measurement at time t+Δt; and
V is vehicle speed.

IX. ON-BOARD COMPUTING ARCHITECTURE—SECOND EXAMPLE—FIG. 8

FIG. 8 illustrates a hardware-based computing or controlling apparatus 800. The controlling apparatus 800 can be referred to by other terms, such as computing apparatus, controller, controller apparatus, the like, or other.

The controller apparatus 800 is in various embodiments part of a greater system 802, such as a vehicle. The controller apparatus 800 can be, be a part of, include, or be in communication with an on-board computer (OBC), an electronic control unit (ECU), or other computing apparatus of the greater system 802—for example, a vehicle, such as an automobile.

The hardware-based controlling apparatus 800 includes a hardware-based computer-readable storage medium, or data storage device 804 and also includes the hardware-based processing unit 106, described above, connected or connectable to the computer-readable storage device 804 by way of a communication link 108, such as a computer bus or wireless structures.

The data storage device 804 can in any way be like the device 104 described above.

The data storage device 104 includes one or more storage modules 810 storing computer-readable code or instructions executable by the hardware-based processing unit 106 to perform the functions of the hardware-based controlling apparatus 800 described herein.

The data storage device 804 in some embodiments also includes ancillary or supporting components 812, such as additional software and/or data supporting performance of the processes of the present disclosure, such as one or more user profiles or a group of default and/or user-set preferences.

The hardware-based controlling apparatus 800 also includes a communication sub-system 114 for communicating with one or more local and/or external networks 115, such as the Internet, or remote systems 860.

The communication sub-system 114 in various embodiments includes any suitable componentry, including the components 116, 118, 120, 122 shown and described above.

External devices 850, 860 with which the sub-system 114 communicates are in various embodiments nearby, remote, or both.

External or extra-vehicle devices to which the hardware-based controlling apparatus 100 can communicate with, in performance of functions of the present technology, include one or more local add-on device 850, such as a user smartphone, or other local device having at least one relevant sensor or sensor peripheral configured to provide output that can be used by the vehicle 802, by existing vehicle functions and/or functions that the vehicle can perform using new software—e.g., applications—and the new sensor output.

An example vehicle function is autonomous driving, which can rely in part on vehicle-camera data, such as from a camera 128, shown schematically in FIG. 1. The vehicle 802 can, according to the present technology, use visual data from the add-on device 850 camera, in addition to or instead of the existing vehicle-camera data.

External or extra-vehicle devices can also include a remote system 860, such as a server (e.g., application server) or data, customer-service, and/or control center, which can be reachable by the indicated network(s) 115, such as the OnStar® control center described above.

The vehicle 802 also includes a sensor/peripheral sub-system 126, such as that described above in connection with FIG. 1. The sub-system 126 includes sensors or peripherals like those described above, such as sensors 128, 130, 132, 134.

X. VEHICLE DATA STORAGE—SECOND EXAMPLE—FIG. 9

Figure 9:
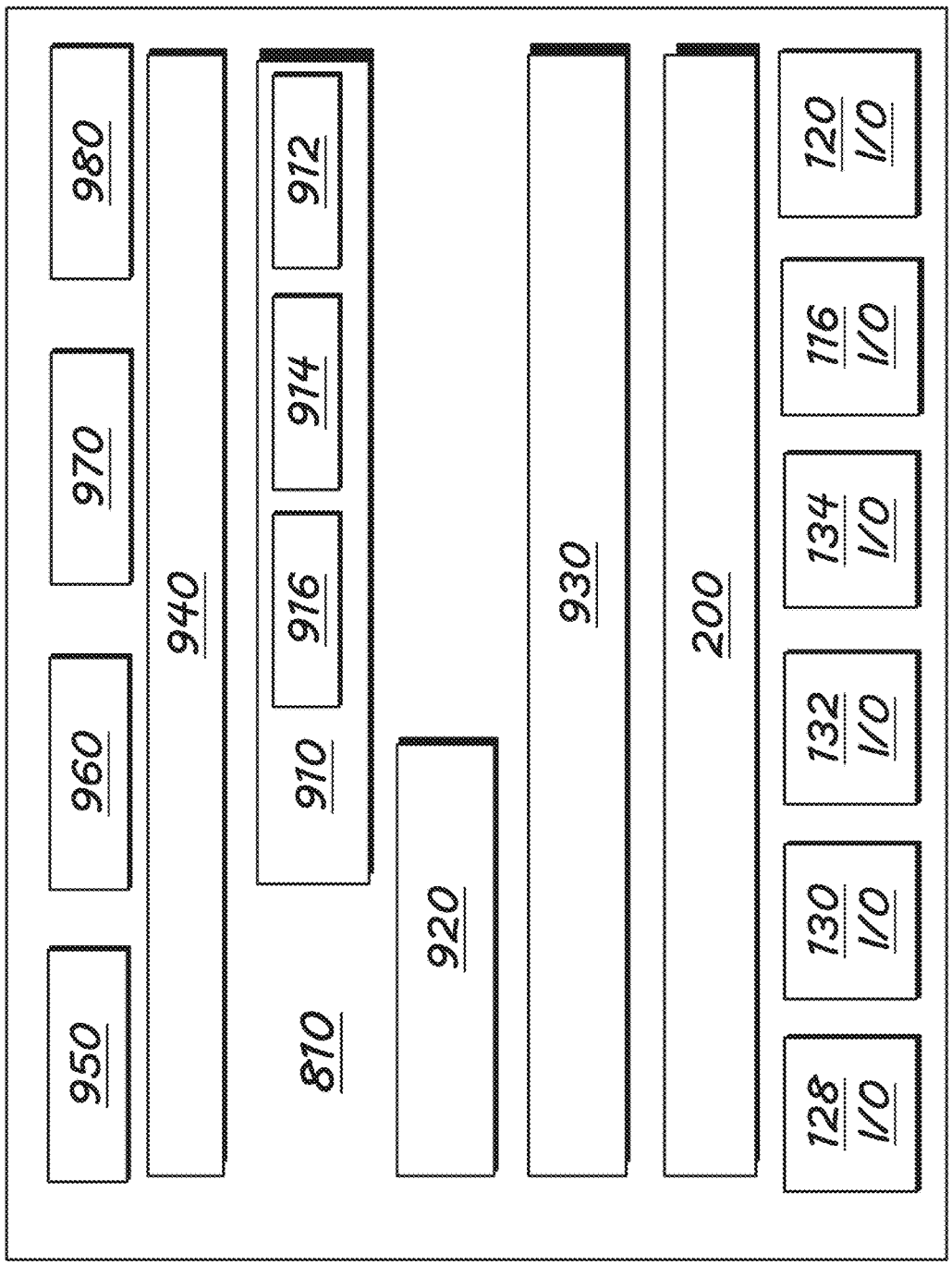
FIG. 9 shows in more detail some of the features of the data storage device of FIG. 8.

FIG. 9 shows in more detail some of the features of the data storage device 804 of the vehicle 802 of FIG. 8. As mentioned, instructions or code of the data storage device 804 can be arranged in one or more modules 810, shown in FIG. 9.

Any of the code or instructions described can be part of more than one module. And any functions described herein can be performed by execution of instructions in one or more modules, though the functions may be described primarily in connection with one module by way of primary example. Each of the modules or sub-modules thereof can be referred to by any of a variety of names, such as by a term or phrase indicative of its function.

As just an example, instructions configured to, via the hardware-based processing unit 106, perform application-program-interface (API) system call functions at a data plane of the vehicle computing system 800, can be referred to as a vehicle-system-call module, a system-call-API module, or the like (reference example, element 1810). As another example, instruction configured to cause the processor to perform proxy sensor device driver functions at the vehicle computing system 800 can be referred to as a proxy-sensor driver, proxy-sensor driver module, a proxy-sensor-device driver module, or the like (reference example, element 2220).

The code or modules 810 include an operating system 200, and any input/output components 116 I/O, 120 I/O, 128 I/O, 130 I/O, 132 I/O, and 134 I/O, which are described above.

The code 810 further includes vehicle-side client components 910, middleware 920, and kernel-space elements 930. The add-on-device-side server components 910 include a discover component 912, a communications-transport component 914, and a control component 916.

In various embodiments, the kernel space 930 is customized for the present technology, allowing the add-on-device-hardware sharing without need to alter or customize the kernel space 1130 of the add-on device 850.

The code 810 of the add-on computing system 800 further includes add-on-device-side server components 910, middleware 920, and kernel-space elements 930. The server components 910 include a discover component 912, a communications-transport component 914, and a control component 916.

The code 810 components further include input/output (I/O) application program interfaces (APIs) 940 for various applications 950, 960, 970, and 980 operating at the vehicle 902. While four applications are shown by way of example, the code 810 can include or be in communication with any number of applications that can benefit from operations of the present technology.

Components of the code 810 may be arranged in, or viewed as functioning, in a data plane and a control plane. The control plane can perform functions such as initiating, arranging, orchestrating, and/or managing operations within the system 800, such as regarding actions and interactions at and between any of the operating system 200, input/outputs (e.g., 128, 130, etc.), middleware 920, and kernel-space elements 930. The data plane can execute any of the operations initiated, arranged, orchestrated and/or managed in the control plane.

Functions of the code components, and the control plane and the data plane, of the vehicle computing system 800 are described further, below.

XI. ADD-ON DEVICE—SECOND EXAMPLE—FIG. 10

Figure 10:
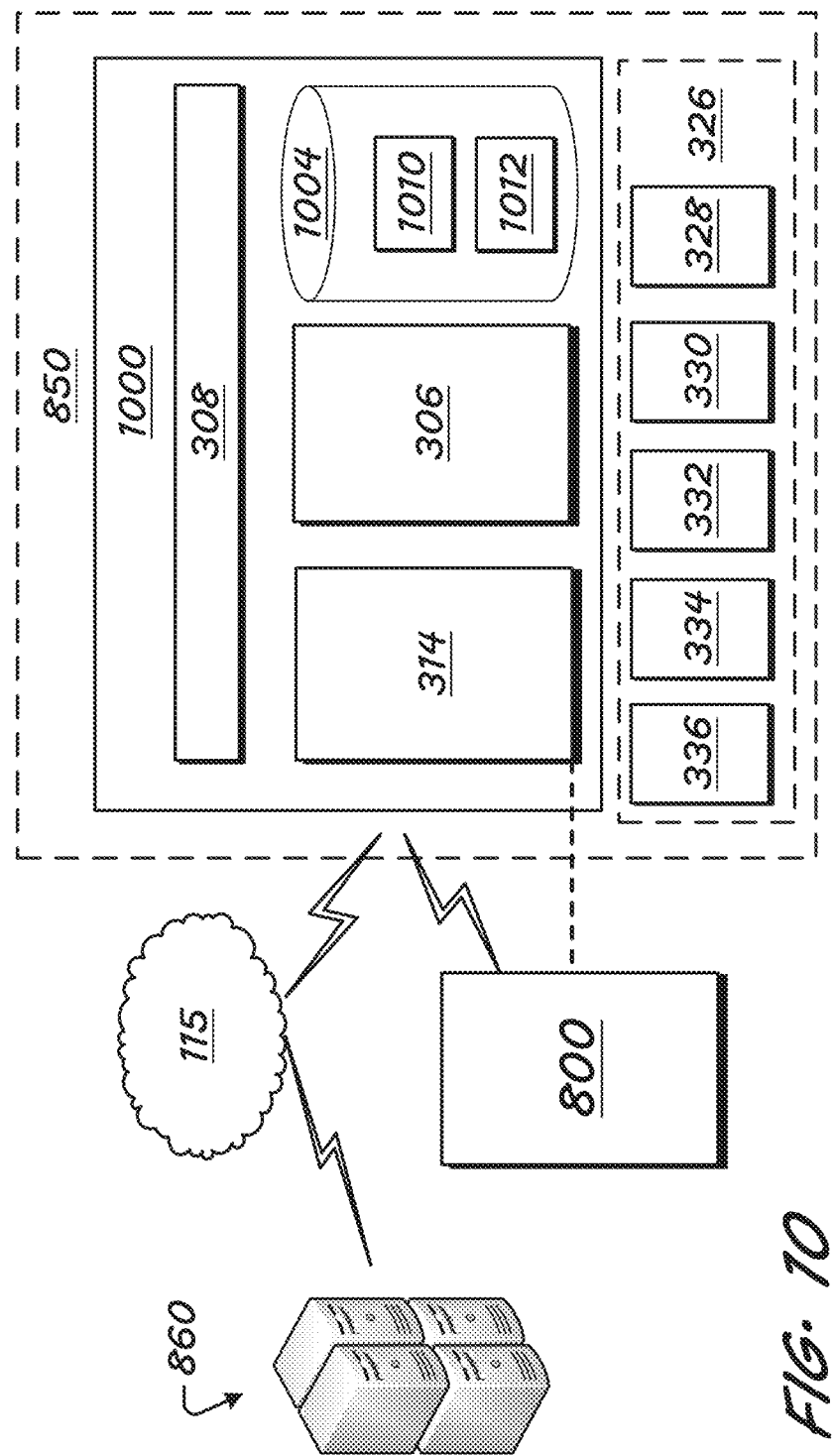
FIG. 10 illustrates schematically the example add-on device of FIG. 8.

FIG. 10 illustrates schematically the example add-on device 850 shown in FIG. 8.

The add-on device 850 can be referred to by other terms, such as a user device, a local device, an add-on device, a plug-in device, an ancillary device, system, or apparatus. The term add-on device 850 is used primarily herein because the device 850 is not an original part of the greater system 802, such as an automobile, with which the device 850 is used.

The add-on device 850 includes a computing architecture or add-on computing system 1000. The computing architecture 1000 can be referred to by a variety of terms, such as hardware-based add-on controlling apparatus 1000.

The add-on device architecture 1000 includes a hardware-based computer-readable storage medium, or data storage device 1004 and also includes a hardware-based processing unit 306 connected or connectable to the computer-readable storage device 1004 by way of a communication link 308, such as a computer bus or wireless structures.

The hardware-based processing unit 1006 can be in any way like the processing units described above, and also can be referenced by other names, such as processor, processing hardware unit, the like, or other.

The data storage device 1004 can be in any way like the storage devices described above. The data storage device 1004 can include, for instance, one or more storage modules 1010 storing computer-readable code or instructions executable by the hardware-based processing unit 1006 to perform the functions of the hardware-based controlling apparatus 800 described herein.

The data storage device 1004 in some embodiments also includes ancillary or supporting components 1012, such as additional software and/or data supporting performance of the processes of the present disclosure, such as one or more user profiles or a group of default and/or user-set preferences.

The add-on device architecture 1000 also includes the communication sub-system 314, like that mentioned above, for communicating in this case with the vehicle computing system 800—such as by wired or wireless connections, one or more local or external networks 115, such as the Internet, or remote systems 860.

The communication sub-system 314 may include, as described above, any of a wire-based transceiver or port, at least one long-range wireless transceiver, and one or more short- and/or medium-range wireless transceivers. The wired port can include, for instance, a universal-serial-bus (USB) port. Example transceivers, communication protocols, and the like are described above.

As with the first example add-on device 150, described above, 3, 4, the present add-on device 850 also includes a sensor sub-system 326 comprising sensors providing information to the add-on device computing architecture 1000.

The arrangement can be configured so that the add-on device architecture 1000 communicates with, or at least receives signals from sensors of the sensor sub-system 326, via wired or short-range wireless communication links.

Original vehicle sensors are, as mentioned, generally domain-specific for a vehicle function and therein configured and arranged for a specific purpose by having robust calibration and customization for the function. New applications being developed for vehicles continuously, though, require or would benefit from one or more sensing capabilities that a vehicle may not already have.

Add-on devices 850 such as smartphones and OTS devices could have the required or preferred sensors, or sensors having better characteristics over sensors that the vehicle is originally equipped with, lending to improved performance of the new application. Add-on-device sensors could have higher resolution or accuracy, for instance. As with the first example add-on device 150, the present example add-on device 850 includes an add-on-device sensor sub-system 326 having, in various embodiments, at least one camera 328, such as a three-dimensional (3D) camera or peripheral, or peripheral system, and at least one microphone 330. Another example sensor is an inertial-momentum unit (IMU) 332, such as one having one or more (e.g., 3D accelerometers). Another example sensor is a barometer, or barometric sensor 334.

Another icon 336 is provided to indicate expressly one or more other sensors that the add-on device 850 can include. Other example sensors include a geo-location receiver, a gyroscope sensor, an altimeter, other accelerators, magnetometer, proximity, light sensor, touch sensor, NFC or other wireless transceiver/detector, and a biometric sensor, —e.g., voice recognition, finger or thumb-print recognition, breathalyzer, and facial, retina or other recognition sensors.

XII. ADD-ON DEVICE DATA STORAGE—SECOND EXAMPLE—FIG. 11

Figure 11:
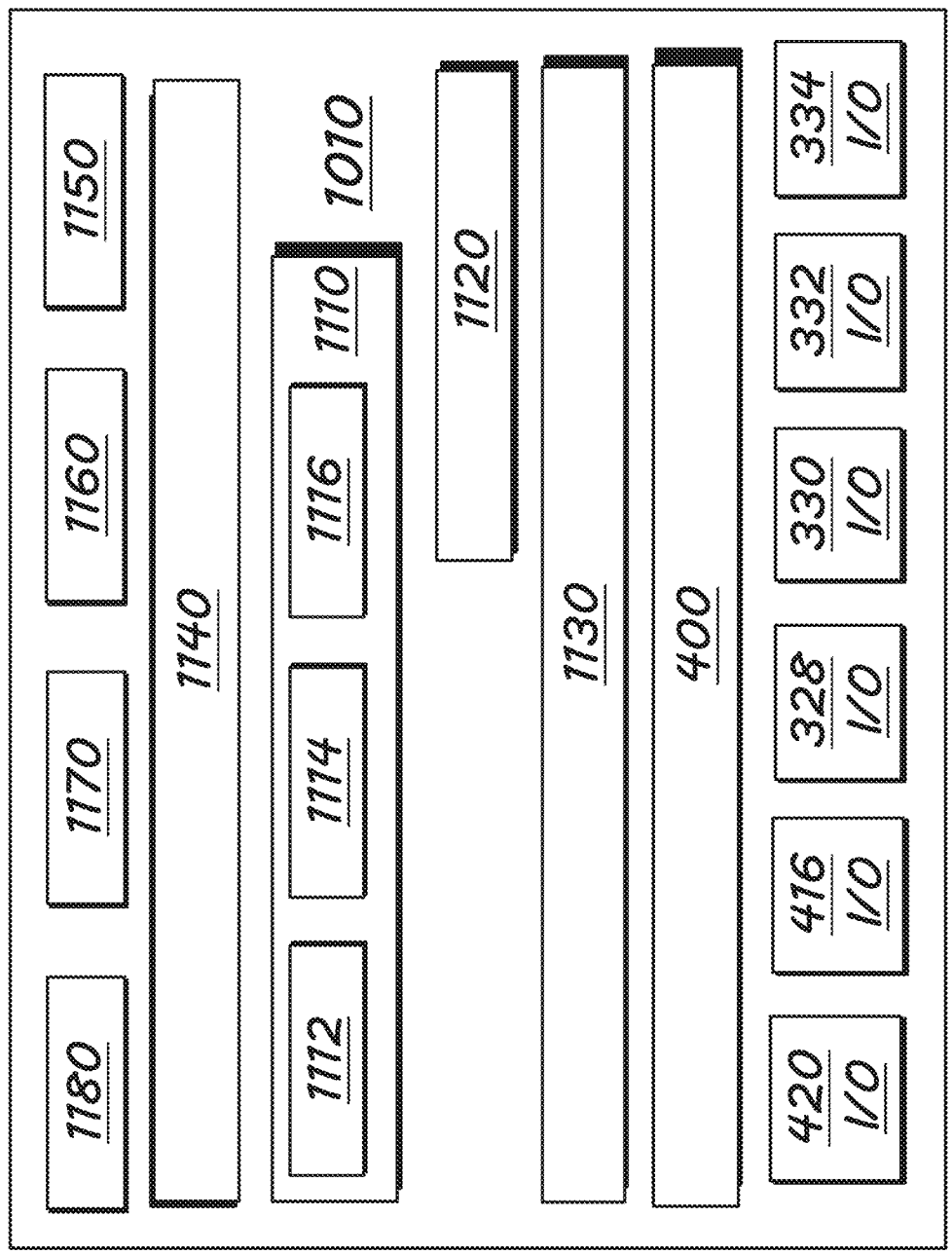
FIG. 11 shows in more detail some of the features of the data storage device of the add-on device of FIG. 10.

FIG. 11 shows in more detail some of the features of the data storage device 1004 of the add-on device 850 of FIG. 10.

As mentioned, instructions or code of the data storage device 1004 can be arranged in one or more modules 1010. The data storage device 1004 may also include ancillary components 1012 (FIG. 10), such as additional software and/or data supporting performance of the processes of the present disclosure.

As with the vehicle code of vehicle data storage 804, any of the code or of the data storage 1004 of the add-on device 850 described can be part of more than one module. And any functions described herein can be performed by execution of instructions in one or more modules, though the functions may be described primarily in connection with one module by way of primary example. Each of the modules or sub-modules thereof can be referred to by any of a variety of names, such as by a term or phrase indicative of its function.

As an example, add-on device 850 code (e.g., reference 1610) configured to, via the hardware-based processing unit 306, perform application-program-interface (API) call functions, can be referred to as an API call module, a system-call API module, or the like. As another example, code of the add-on device 850 (e.g., reference 1310), being configured to perform driver functions regarding one or more add-on device sensors, can be referred to as a sensor driver, a sensor driver module, a sensor device driver module, the like or other.

As with the code 310 of the first example add-on device 150, the code 1010 include an operating system 1100, and multiple input and/or output components 328, 330, 332, 334, etc. The input/output components correspond to system ports for respective system inputs or outputs, such as an add-on device camera, altimeter, touch-sensitive display screen, keyboard, etc.

The code 1010 of the add-on computing system 1000 further includes add-on-device-side server components 1110, middleware 1120, and kernel-space elements 1130. The server components 1110 include a discover component 1112, a communications-transport component 1114, and a control component 1116.

The code 1010 components further include input/output (I/O) application program interfaces (APIs) 1140 for various applications 1150, 1160, 1170, and 1180 operating at the vehicle 1102. While four applications are shown by way of example, the code 1010 can include or be in communication with any number of applications that can benefit from operations of the present technology.

Components of the code 1010 may be arranged in, or viewed as functioning in, a data plane and a control plane. The control plane can perform functions such as initiating, arranging, orchestrating, and/or managing operations within the system 800, such as regarding actions and interactions at and between any of the operating system 400, input/outputs (e.g., 330, 332, 334, etc.), middleware 1120, and kernel-space elements 1130. The data plane can execute any of the operations initiated, arranged, orchestrated and/or managed in the control plane.

Features and functions of the code components, and the control plane and the data plane, of the vehicle computing system 800 are described further, below.

Functions of the code components, and the control plane and the data plane, of the add-on-device computing system 1000 are described further, below.

XIII. COMPONENTS AND INTERACTIONS—SECOND EXAMPLE—FIGS. 12-22

XIII.A. Overview of the Arrangement—FIG. 12

Figure 12:
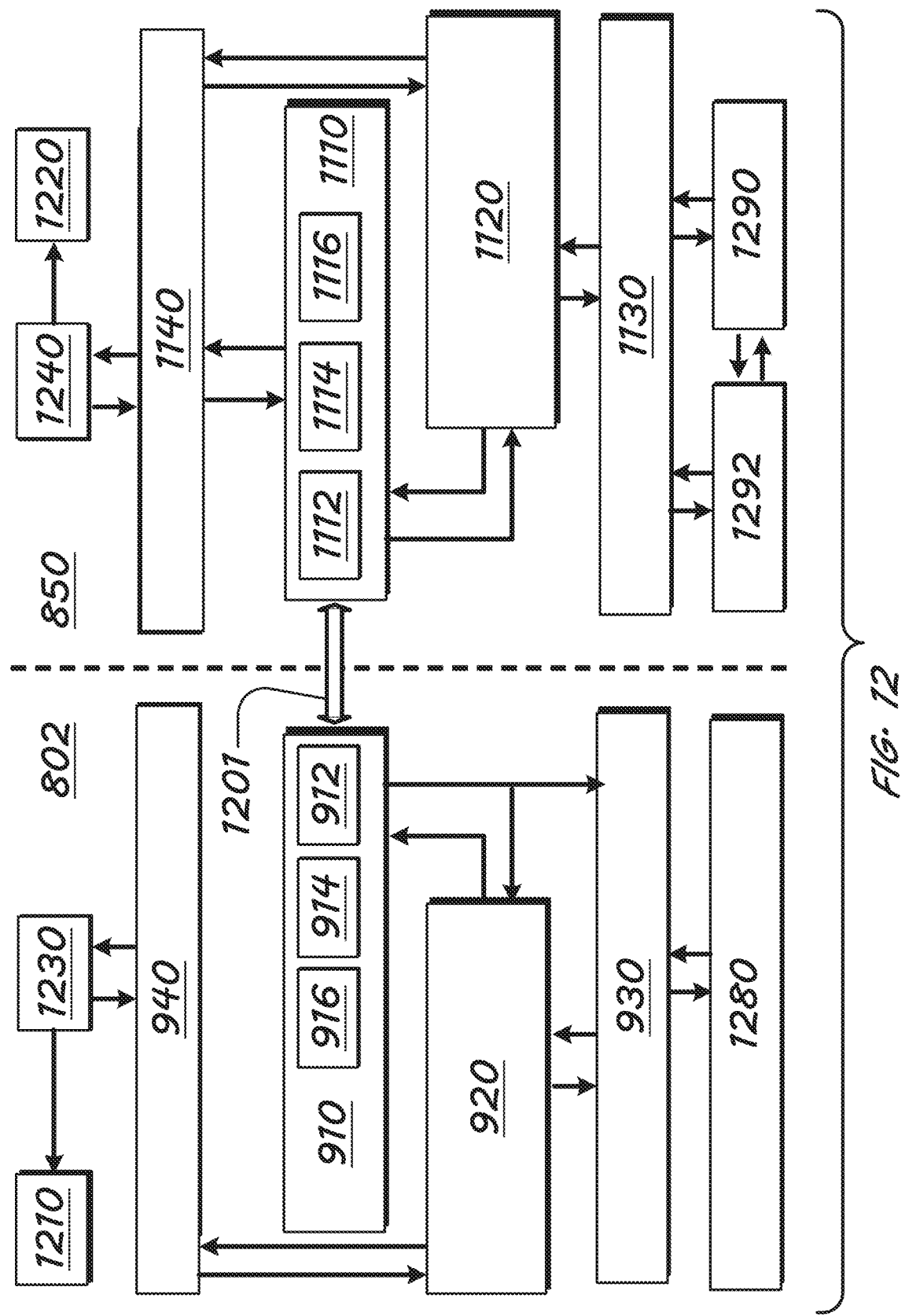
FIG. 12 shows select components of the vehicle and the add-on device of FIGS. 8-11, and example intra- and inter-device or system communications.

FIG. 12 shows select components of the vehicle 802 and the add-on device 850 of FIGS. 8-11, and example intra- and inter-device or system communications. Most components are shown in earlier figures.

The vehicle 802 includes one or more communication interface 1210, such as a vehicle-user interface—e.g., heads-up display (HUD) or other screen, a vehicle speaker, a vehicle autonomous driving system, a vehicle HVAC system, or a communication transceiver for sending a message to a remote device such as a remote customer-service (e.g., OnStar®) server or computer system.

The add-on device 850 includes any analogous or otherwise suitable communication interface 1220.

The interfaces 1210, 1220 receives output from respective applications 1230, 1240 being executed at the vehicle 802 and add-on device 850.

Vehicle-side applications 1230 are shown in FIG. 9 by reference numbers 950, 960, 970, and 980. Add-on device apps are shown in FIG. 11 by references 1150, 1160, 1170, and 1180.

FIG. 12 also shows the vehicle-side input/output (I/O) application program interfaces (APIs) 940 to the vehicle apps 1230, and the add-on-device I/O APIs 1140 to the add-on-device apps 1240. The apps 940, 1240 and/or the corresponding I/O APIs 940, 1140 can be considered part of a user space, from the perspective of the respective operating system 200, 400.

FIG. 12 shows schematically a flow of functions, representing various algorithms of the present technology.

In various embodiments, functions can be referred to as virtualizing and/or docking the subject sensor(s) of the add-on device. This in various cases can include accommodating common, or known, sensors and less common or unknown sensors, heretofore not recognized by vehicle code. In various embodiments, the vehicle system 100 is preconfigured with code relating to certain sensors, even if the code is dormant or not used when the vehicle is originally made and put into operation. These sensors can be referred to as common or known sensors. Other sensors, that the vehicle system 100 would not recognize, due to not having pre-established code relating to such sensors, can be referred to as uncommon, or unknown sensors.

It should be understood that the steps, operations, or functions of the algorithms are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated algorithms 600, 700 can be ended at any time.

In certain embodiments, some or all operations of the algorithms and/or substantially equivalent operations are performed by a processor, e.g., computer processor, executing computer-executable instructions stored or included on a computer-readable medium, such as one or both of the data storage devices 804, 1004 of the systems 800, 1000, or similar features that can be present at a remote server or computer system 860.

The client component 910 of the vehicle 802 communicates with the server component 1110 of the add-on device 850, as indicated by reference numeral 1201. The client and/or server components 910, 1110, or any other add-on device or vehicle-system components described (e.g., middleware, kernel-space components), may be obtained from an online source, such as from a remote server 860. A specially configured server, or server/client, component or application for the add-on device may be obtained, for instance, via the add-on device from a mobile-device application store, market, or the like. In various embodiments, the resource-sharing application allows the add-on device to interface with the corresponding vehicle-side components for the resource sharing of the present technology. The app is in various implementations particular to one or more add-on device resources. As an example, the app may be specifically for use at the add-on device to share data from a barometer, a wifi transceiver, or a printer, of the add-on device.

For any embodiment described herein, any vehicle component described—e.g., client application, middleware components, kernel components—are downloaded as part of a software upgrade or update received at the vehicle system 100 from the add-on device or a remote system.

As referenced, the add-on-device-side server components 910 include a discover component 912, a communications-transport component 914, and a control component 916, and the server components 1110 include a discover component 1112, a communications-transport component 1114, and a control component 1116.

In an initial discover, or beaconing, process, the discover components 912, 1112 interact. In one implementation, the discover component 912 of the vehicle 802 and/or the discover component 1112 of the add-on device 850 detects presence of a local area network, or other connection, such as a USB connection, to the server-side discover component 912 and the client-side discover component 1112, respectively, and the components 912, 1112 communicate together to determine whether a fitting arrangement can be established. Some of all of the communications of the discover components 912, 1112 may be channeled though and sent by the transport components 914, 1114, respectively.

In various embodiments, the client-side discover component 912 performs a service-discovery routine or process to determine availability and technical capability of add-on-device hardware—e.g., mobile device phone or barometer—and to determine whether the add-on-device hardware can be virtualized at the/to the vehicle.

The vehicle client 910 indicates its identity in any suitable manner, such as by indicating, by message transmitted or broadcast, any of (1) characteristics of the client system, such as this it is a vehicle head unit device, and (2) identification information for the vehicle client system 910, computing system 800, or vehicle 802, such as an alphanumeric ID.

Separately or along with identifying itself, the vehicle-side arrangement also indicates, by the same message or separate message, its goal or goals for the sought connection with the add-on device. The goal indication may include the type of service sought, such as camera data desired, audio (microphone) data desired, a printer for printing information on paper, a wifi service, etc.

The message can indicate a particular type of add-on device component to be used, such as by providing a list of camera types that qualify for the implementation.

In various embodiments, in the message with the service goal, or in a separate message, the vehicle-side arrangement indicates needed or desired parameters for the service sought. The parameters message may indicate, for instance, a video speed requirement, a latency of transmission requirement, a maximum transmission bandwidth, or a minimum pixilation, within which the vehicle system wants to receive camera data.

The add-on device arrangement—e.g., the add-on device server 912—responds accordingly, such as by indicating at least any relevant resources at the add-on device 850. The response message may indicate simply whether it can satisfy the request and/or provide details, such as resource characteristics—type of add-on device camera, video speed, etc.

In some scenarios, the add-on device arrangement indicates that the add-on device does not have the requested resource, whether by not having the resource or by not having such resource fitting requirements communicated by the vehicle system. In contemplated embodiments, any of various results may follow. The vehicle system may change its ask, such as by requesting another add-on device resource, or changing the requirements communicated, such as by lowering the required capability, to determine if the add-on device can satisfy the adjusted request.

In a contemplated embodiment, the add-on device, in addition to indicating that it cannot satisfy the request, advises the vehicle system of add-on-device resources that it has that may be satisfactory for use by the vehicle system. If the vehicle system is seeking high-speed audio-visual, for instance, the add-on system may indicate that the add-on device can provide only visual data. In this case, while the vehicle system may prefer or at least have requested to receive both audio and visual together from the one add-on source, it may be that it would be satisfactory for the vehicle to obtain the video from the add-on device and obtain real-time audio from another source, such as a vehicle microphone (though the vehicle microphone may be less capable, or not as well position to capture desired audio) or a another add-on device.

In various embodiments, upon the vehicle system—here, the discover component 912, for instance—determining that it can use the add-on device service (e.g., add-on device camera, or barometer), the vehicle computing system 800 connects with the add-on device computing system 1000. The connection may include agreeing on communication characteristics, such as timing by which add-on-device resource data will be sent or pushed, or whether only in response to requests (pull), and applicable communication protocol or domain to use.

In some implementations, the add-on device must accept a connection request or communication from the vehicle system to complete the connection.

Once the connection is established, the vehicle system uses the add-on device resource(s) according to the present technology, described further below.

In various embodiments, the add-on device system 1000 reserves or books the add-on device resource (e.g., camera, barometer) for use by the vehicle. The reservation can have any suitable scope, such as by being in place for a set period of time, being in place until canceled, such as in response to an end session communication from the vehicle, or only in instances in which the vehicle system requests resource data or use, such as in response to the vehicle system requesting a photo.

Applicable add-on device resource hardware is indicated in FIG. 12 by reference numeral 1290. The hardware, accompanied by corresponding software in some cases (e.g., a microphone linked to voice-recognition, or voice-to-text, software), may include any resource usable by the vehicle, such as an add-on-device camera, microphone, printer, or barometer, just to name a few. Vehicle hardware resources, which may be used by the vehicle system or, as mentioned, by the add-on device (server/client relationship switched), are indicated by reference numeral 1280 in FIG. 12. The software may include codecs structures, for coding, decoding, or otherwise processing hardware output, as described further below.

Vehicle system 800 and add-on system 1000 components, of the vehicle 802 and add-on device 850, are configured in one or more of various formats, corresponding to various types of connection between, and applicable processing to be performed at, the systems 800, 1000. Example configurations for the sharing arrangement include: (1) an API, or wireless, configuration, (2) a USB, or other wired or wireless protocol, configuration, and (3) a codec configuration. The first configuration may also be referred to as an API call configuration. The second configuration may be based on any suitable internet protocol, and referred to as an IP configuration, a USB/IP configuration, the like, or other.

In a contemplated embodiment, more than one configuration can be in place and used in the same sharing scenario. Codecs can be used, for instance, with the wireless configuration or the wired configurations.

The data from the add-on-device hardware resource 1290 is passed, in a data plane of the add-on-device system 800, to components of the add-on device kernel space 1130, middleware 1120, and on to the server app 1110. Initiation and control of the data transfers, as with all data sharing operations described, are managed or otherwise controlled by suitable control plane structures, as described further below.

The kernel space 1130 of the add-on device 850 comprises any suitable structure for processing hardware data before it is passed to the add-on device middleware 1120.

XIII.B. Add-On Device Kernel Space for API-Call Config (1)—FIG. 13

Figure 13:
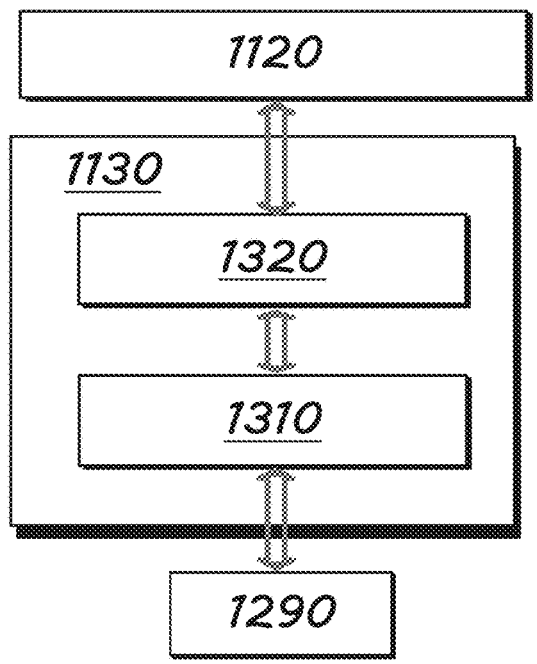
FIG. 13 shows a first example add-on-device kernel space, for a first, API, or wireless, configuration.

For the first, API, or wireless, configuration (1), the kernel space 1130 may include an add-on-device hardware driver 1302, such as add-on-device sensor device driver, as shown in FIG. 13. The driver 1302 controls the applicable hardware 1290. The kernel space 1130 may also include an add-on-device subsystem 1320 receiving the hardware data from the device driver 1310, as also shown in FIG. 13. The subsystem 1320 may initiate or perform any suitable storage or processing of the hardware data before the data is passed to the add-on-device middleware 1120.

The subsystem 1320 provides universal interface for the device driver 1310, to send data, and provides universal interface for middleware 1120, to receive data.

XIII.C. Add-on Device Kernel Space for USB/IP Config (2)—FIG. 14

Figure 14:
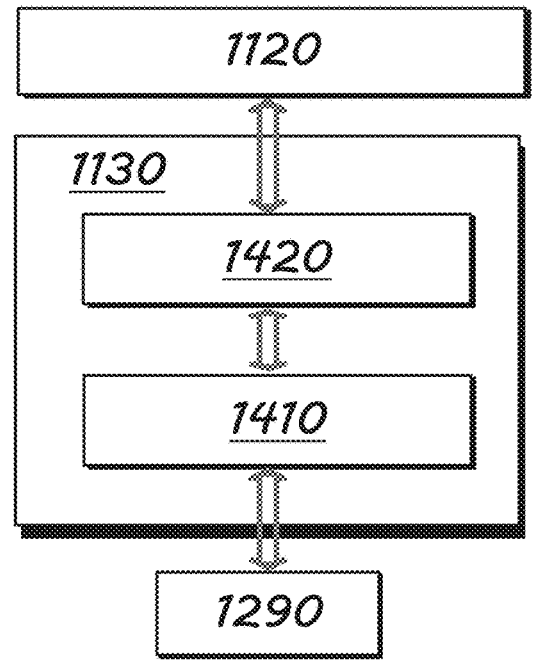
FIG. 14 shows a second example add-on-device kernel space, for a second, USB/IP, or wired, configuration.

For the second, USB/IP, or wired, configuration (2), the kernel space 1130 may include a USB (wired or wireless protocol) host controller 1410, as shown in FIG. 14. The USB host controller 1410 interfaces between the applicable add-on-device hardware 1290 and a USB host controller driver 1420. The USB host controller device 1420 interfaces between (i) the add-on device hardware 1290 and USB host controller 1410, and (ii) the middleware 1120.

The USB host controller 1410 is or includes hardware that controls the USB add-on-device hardware 1290, and sends and receives data to/from the USB add-on-device hardware 1290. The USB host controller driver 1420 operates as the device driver for USB host controller 1410.

XIII.D. Add-on Device Kernel Space for Codec Config (3)—FIG. 13

Figure 15:
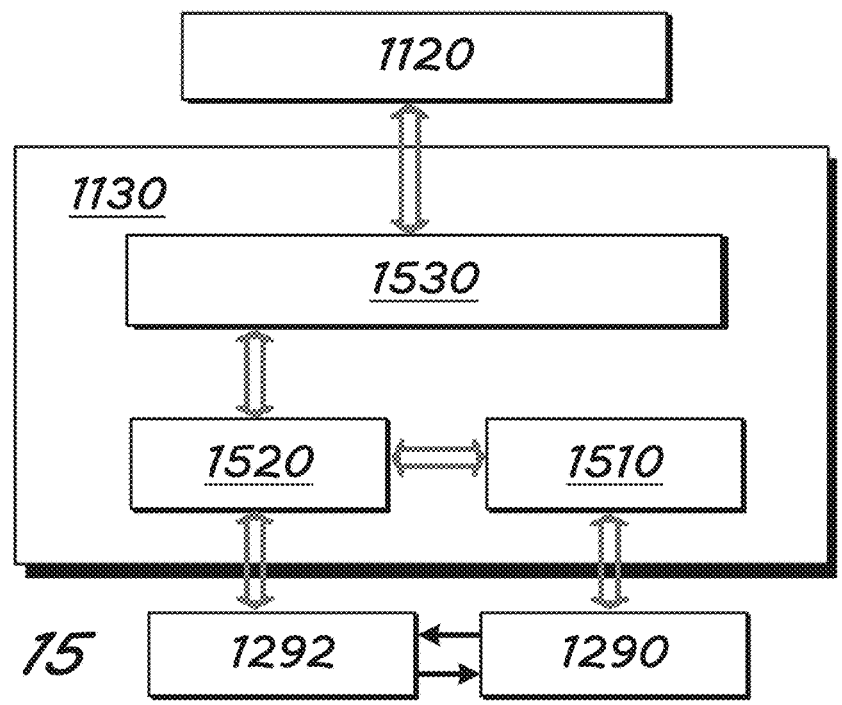
FIG. 15 shows third example add-on-device kernel space, for a third, codec, configuration.

For the third, codec, configuration (3), the kernel space 1130 may include a sensor device driver 1510. In this configuration, the hardware 1290 includes or is in communication with encoder hardware, which is referenced by 1292 in FIG. 12. The kernel space 1130 in this case also includes an encoder device driver 1520. The encoder device driver 1520 encodes the add-on-device hardware data received from the hardware 1290 or the sensor device driver 1510, or affecting (initiating, managing, controlling, or otherwise affecting) encoding at another device, such as at the hardware. The kernel space 1130 of this configuration (3) may also include an add-on-device subsystem 1530, which may be like or similar to the device subsystem 1320 of the first configuration (1). The subsystem 1530 receives the hardware data from the encoder device driver 1520, as also shown in FIG. 15. The subsystem 1530 may initiate or perform any suitable storage or processing of the add-on-device hardware data before the data is passed on to the add-on-device middleware 1120, including functions analogous to the functions of the kernel-space subsystem 1320 of the first configuration (1) (FIG. 13).

XIII.E. Add-on Device Kernel Space for API-Call Config—FIG. 13

With continued reference to FIG. 12, the middleware 1120 receives the hardware data (camera data, wifi-received information, barometer data, confirmation of printing, etc.), as shown. As with the kernel space 1130, the middleware 1120 may have any of a variety of arrangements depending on the configuration, including the example three (3) configurations.

For the printer example, and for any embodiment in which add-on-device output hardware 1290 is being used, any of the described and illustrated components and functions at the add-on device 850 and vehicle system 800 may be used. In this connection, some of the data flow arrows in FIGS. 12-22 are two-way arrows.

XIII.F. Add-on Device Middleware for API-Call/Codec Configs (1)/(3)—FIG. 16

Figure 16:
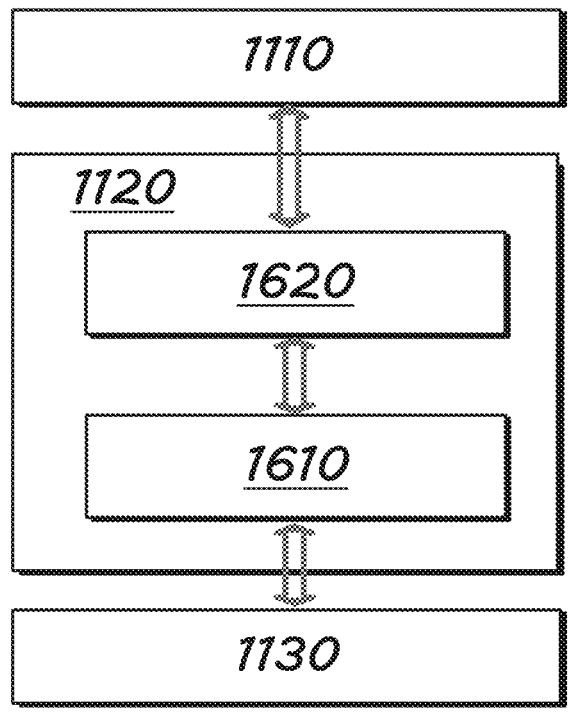
FIG. 16 shows a first example add-on-device middleware arrangement, for the first, API, or wireless, configuration, and also the third, codec, configuration.

FIG. 16 shows an example middleware 1120 arrangement for the first, API, or wireless, configuration (1) and also the third, codec, configuration (3). The middleware 1120 in these cases may include a system call API 1610 and framework components 1620. In various embodiments, the framework components include or work in conjunction with a hardware abstraction layer (HAL).

The system call API 1610 provides universal interface for frameworks components 1620, to access and control data from the kernel space 1130. The framework component 1620 processes and controls data from the kernel space 1130, providing necessary data to the server-side application 1110 and I/O APIs 1140.

XIII.G. Add-on Device Middleware for USB/IP Config (2)—FIG. 17

Figure 17:
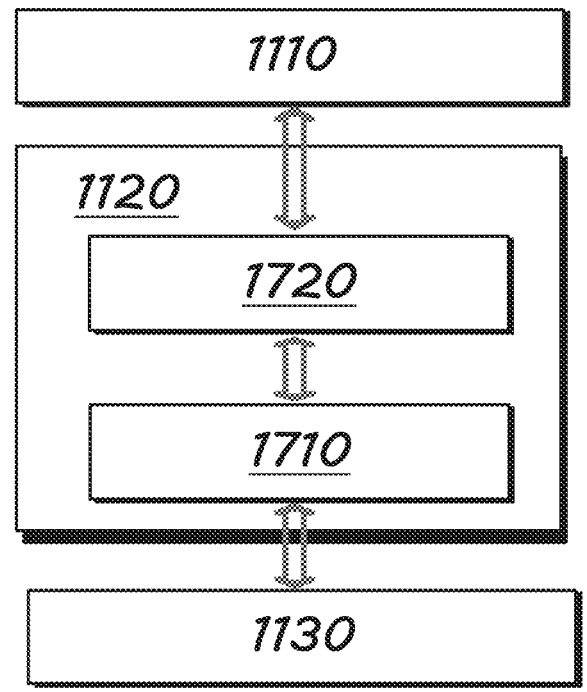
FIG. 17 shows a second example add-on-device middleware arrangement, for the second, USB, or wired, configuration, including a USB core driver.

FIG. 17 shows an example middleware arrangement for the second, USB, or wired, configuration (2). The middleware 1120 in this case may include a USB core driver 1710, which upon performing core driver functions with respect to the data received from the kernel space 1130, and passes data on to and a server-side stub driver 1720.

The USB core driver 1710 provides an interface for the stub driver 1720, to access and control the USB host controller driver 1130. This can be performed without concern or consideration about the type of USB host controller (s) present in the system. The stub driver 1720 emulates the USB per-device driver and is responsible for sending data to or receive data from the server app 1110.

XIII.H. Control of Add-On-Device Middleware and Kernel Space

No matter the configuration (e.g., configurations 1-3), control of the add-on-device middleware 1120 and kernel space 1130 operations can, as referenced, be initiated, managed, or otherwise controlled by a control plane of the system 1000. The control is in various embodiments performed by the control component 1116 of the server-side application 1110. The control plane may include, in the middleware 1120, a system call interface component, for controlling the data plane system call API(s) 1310, for instance. Control plane components and activities regarding each computing element shown can be considered shown by the blocks illustrated. For instance, for embodiments including the system call interface control-plane element, the interface may be considered shown also by block 1310. As another example, for embodiments including the kernel-space-related control plane subsystem and sensor-device-driver components, the control plane components may be considered shown also by the corresponding data plane blocks 1320, 1310. The data-flow arrows between all components—e.g., between the control component 1116 and the middleware 1120 components—can be considered to at least in part indicate control channels.

The control plane of the add-on device system 1000 may also include a hardware-related element, for controlling the add-on device hardware 1290. This hardware-related control element may be considered illustrated by the hardware block 1290.

XIII.I. Device-to-Vehicle Data Transfer

The server application 1110—e.g., the transport component 1114—receives the add-on-device hardware data processed in the add-on-device system 1000 through to, and then by, the USB stub driver 11720 of the middleware 1120, as indicated by upward arrow to the server application 1110 in FIG. 12. The server application, 1110, such as the communications-transport component 1114 thereof, transmits the hardware data to the vehicle 802. The transmission, by wire or wirelessly, is indicated schematically by arrow 1201.

At the vehicle 802, the transmission from the server application 1110 is received at the client application 910, such as by the transport component 914 of the vehicle system 800.

The client application 910 passes, in a data plane of the vehicle system 800, the add-on-device hardware data to the vehicle-side middleware 920, kernel space 930, and any applicable hardware 1280 (e.g., decoder hardware), for processing the add-on-device hardware data for presentation to the applicable vehicle-side application(s) 1230.

Initiation and control of the data transfers, as with all data sharing operations described, are managed or otherwise controlled by suitable control plane structures, as described further below.

As provided, components of the vehicle system 800, as with those of the add-on-device system 1000, are configured in one or more of various formats, corresponding to various types of connection between, and applicable processing to be performed at, the systems 800, 1000. The same example configurations are continued in the description here about vehicle system 800 functions: (1) the API, or wireless, configuration, (2) the USB (wired or wireless protocol) configuration, and (3) the codec configuration.

The middleware 920 receives the hardware data (add-on-device camera data, wifi-received information, barometer data, confirmation of printing, etc.) from the vehicle client application 910, such as from the transport component 914 thereof.

XIII.J. Vehicle Middleware for API-Call/Codec Configs (1)/(3)—FIG. 18

Figure 18:
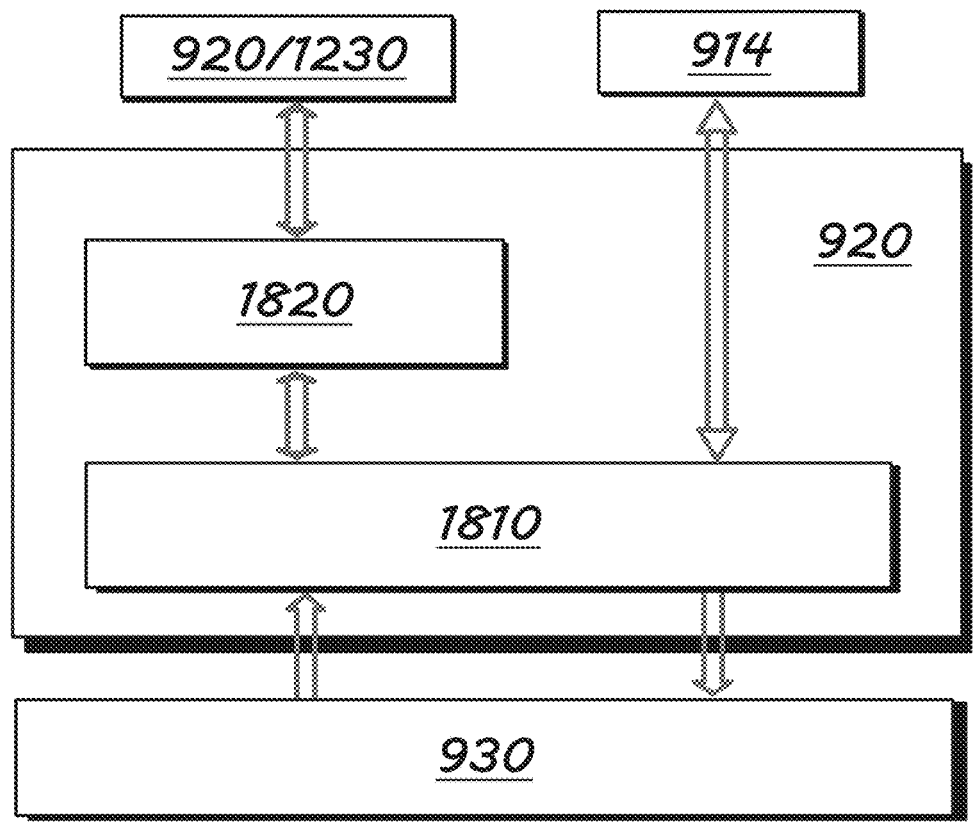
FIG. 18 shows a first example vehicle middleware arrangement for the first, API, or wireless, configuration, and also the third, codec, configuration.

FIG. 18 shows an example vehicle middleware 920 arrangement for the first, API, or wireless, configuration (1) and also the third, codec, configuration (3). The middleware 920 in these cases includes a system call API 1810 and framework components 1820. The system call API 1810 processes the add-on-device hardware data, and passes it to the kernel space 930. Upon processing at the kernel space 930, the system call API 1810 receives the processed data back from the kernel space 930, as shown in FIG. 18.

The system call API 1810 processes the input from the kernel space 930, and passes it on to the frameworks and HAL 1820.

In various embodiments, the system call API(s) 1810 (FIGS. 18, 12) have structure and/or functions corresponding in one or more ways to the structure of the system call API(s) 1610 (FIGS. 16, 12) of the remote system 1000. In various embodiments, the system call API(s) 1810 (FIGS. 18, 12) emulates the system call API(s) 1610 (FIGS. 16, 12) of the remote system 1000.

The frameworks and HAL 1820 processes the add-on-device hardware data, in turn, for use by at least one subject vehicle application 1230. The processed or virtualized add-on-device hardware (e.g., sensor) data is sent by the frameworks and HAL 1820 directly to the application(s) 1230, or to the application(s) 1230 via an input, or input/output (I/O) application program interface (APIs), referenced by 920 in FIGS. 12 and 18.

The emulated system call API 1810 provides a universal interface for the frameworks and HAL 1820, to access and process data from the kernel space 930. The frameworks and HAL 1820 process and control data from the kernel space 930, and provide data to the applications 1230.

As with the add-on device middleware for these configurations [(1), (3)], the framework components in various embodiments include or work with a hardware abstraction layer (HAL). The HAL is considered also shown by block 1820.

The system call API 1810 in various embodiments corresponds in configuration and function to the system call API 1620 of the add-on-device middleware 1120. The vehicle system call API 1810 may be a cloned or emulated version of the system call API 1620 of the add-on device 850, for instance, or vice versa.

XIII.K. Vehicle Middleware for USB/IP Config (2)—FIG. 19

Figure 19:
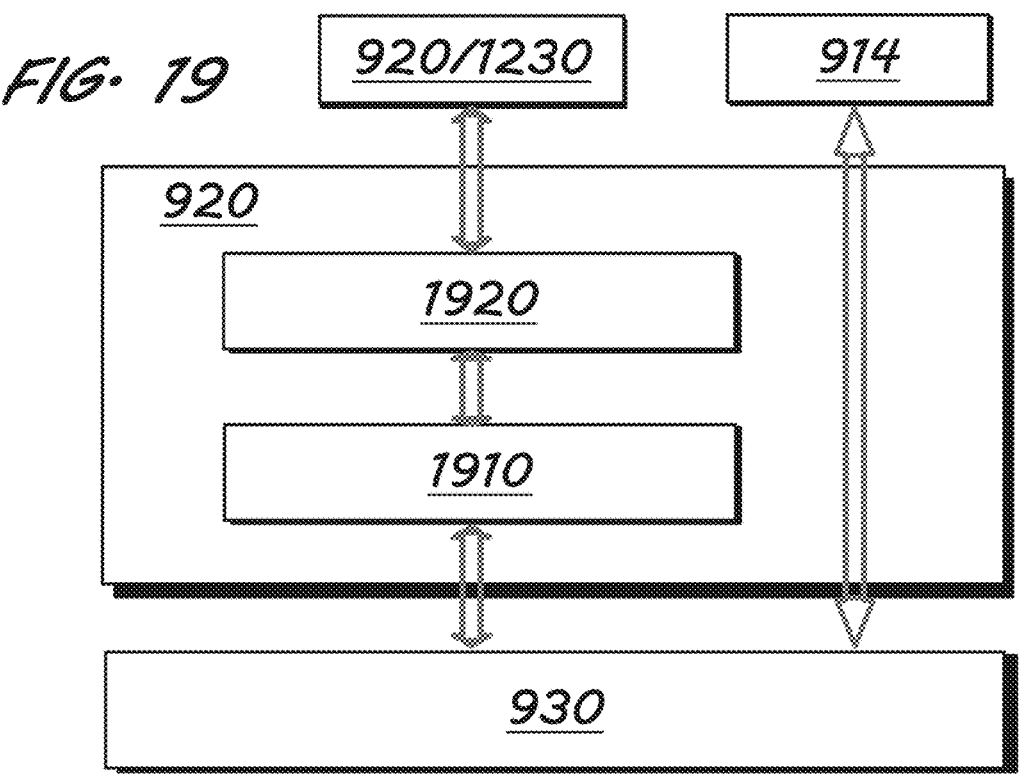
FIG. 19 shows a second example vehicle-side middleware arrangement for the second, USB, or wired, configuration.

FIG. 19 shows an example vehicle-side middleware 920 arrangement for the second, USB, or wired, configuration (2). In various embodiments, the middleware 920 includes a USB core driver 1910 and a USB per-device driver 1920.

In various embodiments for the wired configuration (2), the add-on-device hardware data is passed directly from the transport component 914 to the kernel space 930, as shown in FIG. 19. Upon processing of the add-on-device data at the vehicle-side kernel space 930, which is described further below in connection with FIGS. 20-22, the kernel space 930 passes the add-on-device hardware data to the USB core driver 1910. The USB core driver 1910 processes the input from the kernel space 930, and passes it on to the USB per-device driver 1920. The USB per-device driver 1920 processes the add-on-device hardware data, in turn, for use by at least one subject vehicle application 1230. The processed or virtualized add-on-device hardware (e.g., sensor) data is sent by the USB per-device driver 1920 directly to the application(s) 1230, or to the app(s) 1230 via an input, or input/output (I/O) application program interface (APIs), referenced by 940 in FIGS. 12 and 19.

The USB core driver 1910 provides an interface for the USB per-device driver 1920, to access and control data from the kernel space 930. The USB per-device driver 1920 is responsible for sending various types of data to the application(s) 1230.

XIII.L. Vehicle Kernel Space for API Call Config (1)—FIG. 20

Figure 20:
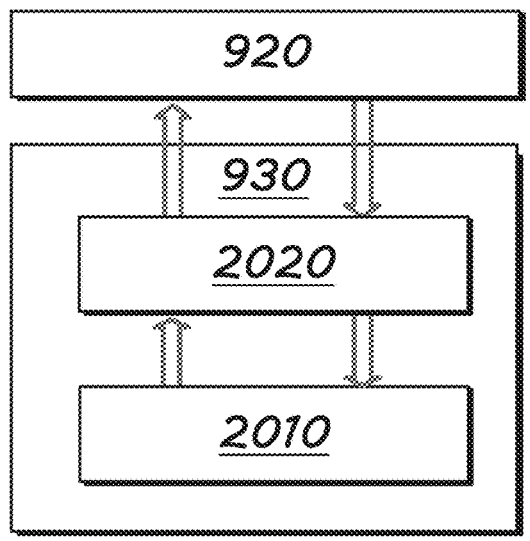
FIG. 20 shows a first example vehicle kernel space, for the first, API, or wireless, configuration.

For the first, API, or wireless, configuration (1), the kernel space 930 includes a virtual subsystem 2020 that receives add-on-device hardware data from the vehicle middleware 920, as shown in FIG. 20. And upon processing the data, the virtual subsystem passes it to a proxy sensor device driver 2010 of the vehicle kernel space 930. The proxy sensor device driver 2010 and/or the virtual subsystem, process the add-on-device hardware data so that the data when passed on to the vehicle application(s) 1230 is acceptable and usable by the vehicle application(s).

The virtual subsystem 2020 may correspond in structure and/or function to the kernel space subsystem 1320 of the add-on device 850 (FIG. 13). And in various embodiments, the proxy sensor device driver 2010 corresponds in structure and/or function to the sensor device driver 1310 of the add-on device 1310. The correspondences allow the vehicle kernel space 930 and balance of the vehicle system 800 to provide the add-on-device hardware data to the vehicle application(s) 1230 in a manner that is functionally generally the same or even generally indistinguishable, from the perspective of the vehicle applications 1230, from situations in which the kernel space 930 and balance of the vehicle computing system 800 is providing vehicle-hardware data (e.g., vehicle sensor data) to the vehicle applications 1230.

In contemplated embodiments, though, for any of the configurations [(1)-(3)], the vehicle system 800 is configured to determine that the add-on-device data is from the add-on device 850, or at least not native to the vehicle. The vehicle system 800 may determine this based on the add-on-device data being received from via the client application 910 and/or because of a structure of, or indicator in, the data itself, for example. The distinction may be useful, for instance, for security reasons, or in situations for which it may be determined best to rely less-heavily on the add-on data for critical operations. An example critical operation is an autonomous-driving operation, or collision avoidance operation.

XIII.M. Vehicle Kernel Space for USB/IP Config (2)—FIG. 21

Figure 21:
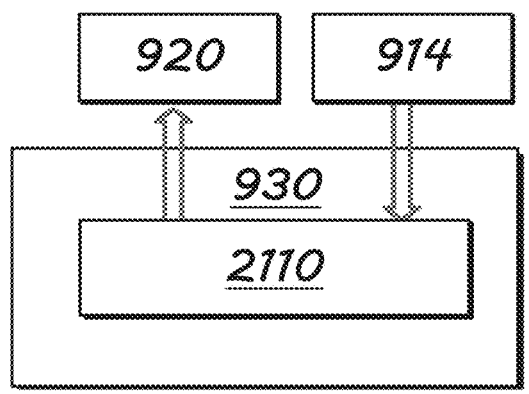
FIG. 21 shows a second example vehicle kernel space, for the second, USB or wired, configuration.

With further reference to the kernel space 930 of FIG. 12, and the second, USB or wired, configuration (2), the kernel space 930 may include a virtual USB host controller interface driver 2110, as shown in FIG. 21. In various embodiments, the virtual USB host controller interface driver 2110 receives the add-on-device hardware data from the client application 910, such as the transport component 914 thereof, as referenced above and shown in FIG. 21. Upon processing the data, the virtual USB host controller interface driver 2110 passes it to the vehicle middleware 920.

The virtual USB host controller interface driver 2110 may correspond in structure and/or function to the virtual USB host controller interface driver 2110 of the add-on-device kernel space 1130. The correspondence allows the vehicle kernel space 930 and balance of the vehicle system 800 to provide the add-on-device hardware data to the vehicle application(s) 1230 in a manner that is functionally generally the same or even generally indistinguishable, from the perspective of the vehicle applications 1230, from situations in which the kernel space 930 and balance of the vehicle computing system 800 is providing vehicle-hardware data (e.g., vehicle sensor data) to the vehicle applications 1230.

As referenced, in contemplated embodiments, though, for any of the configurations [(1)-(3)], the vehicle system 800 is configured to determine that the add-on-device data is from the add-on device 850, or at least not native to the vehicle. The vehicle system 800 may determine this based on the add-on-device data being received from via the client application 910 and/or because of a structure of, or indicator in, the data itself. The distinction may be useful, for instance, for security reasons, or in situations that it may be determined best to rely less-heavily on the add-on data, such as for critical operations such as some or all autonomous-driving operation, or collision avoidance operations.

XIII.N. Vehicle Kernel Space for Codec Config (3)—FIG. 22

Figure 22:
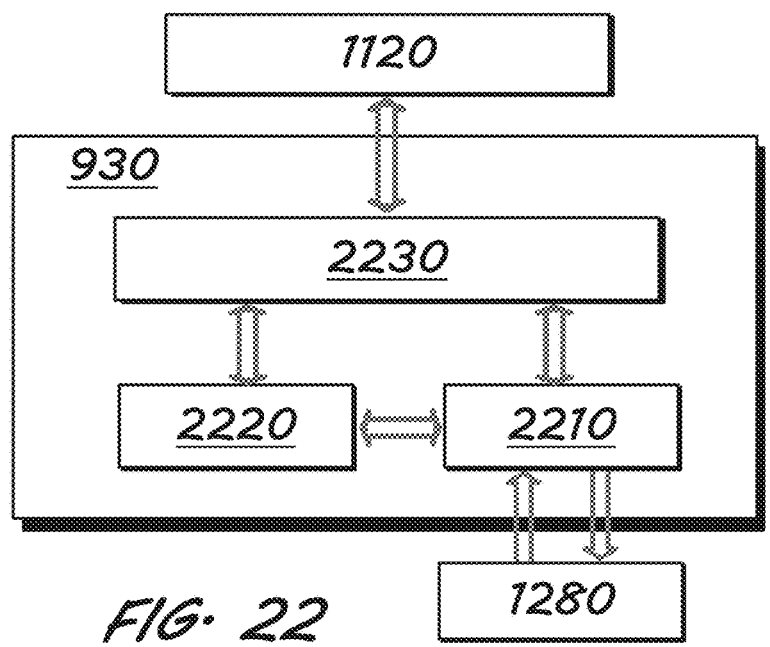
FIG. 22 shows a third example vehicle kernel space, for the third, codec, configuration.

For the third, codec, configuration (3), the kernel space 930 includes a virtual subsystem(s) component 2210, a decoder device driver 2220, and a proxy sensor device driver 2230, as shown in FIG. 22.

The virtual subsystem(s) 2210 can be configured and function as the virtual subsystem(s) 2020 of the first configuration (1) (FIG. 20). The correspondence allows the vehicle kernel space 930 and balance of the vehicle system 800 to, in this codec configuration example, provide the processed or virtualized add-on-device hardware (e.g., sensor) data to the vehicle application(s) 1230 in a manner that is functionally generally the same or indistinguishable, from the perspective of the vehicle applications 1230, from situations in which the kernel space 930 and balance of the vehicle computing system 800 is providing vehicle-hardware data (e.g., vehicle sensor data) to the vehicle applications 1230 instead of add-on-device hardware data.

As referenced, in contemplated embodiments, though, for any of the configurations [(1)-(3)], the vehicle system 800 is configured to determine that the add-on-device data is from the add-on device 850, or at least not native to the vehicle. The vehicle system 800 may determine this based on the add-on-device data being received from via the client application 910 and/or because of a structure of, or indicator in, the data itself. The distinction may be useful, for instance, for security reasons, or in situations that it may be determined best to rely less-heavily on the add-on data, such as for critical operations such as some or all autonomous-driving operation, or collision avoidance operations.

With continued reference to FIGS. 12 and 22, the subsystems(s) 2210 receives the add-on-device hardware data from the vehicle middleware 920 and upon processing it, passes it to the decoder device driver 2220.

The decoder device driver 2220 performs its decoding functions and passes the resulting data to the proxy sensor device driver 2230. The decoder device driver 2220 may correspond in structure and/or function to any of the vehicle decoder hardware (which can be included with vehicle sensors and other hardware, under block 1280 of FIGS. 12 and 22), the add-on-device encoder device driver 1520 (FIG. 15), and the encoder hardware 1292 (FIGS. 12 and 15).

Such vehicle decoder 1280 is part of an original chipset of the vehicle, or not installed after vehicle manufacture for the purpose of the present technology.

XIII.O. Control of Vehicle Middleware and Kernel Space

No matter the configuration [(1)-(3)], control of the vehicle system middleware 920 and kernel space 930 operations, cooperations, resource allocations, and performances can be initiated and managed, or otherwise controlled by a control plane of the vehicle system 800. The control is in various embodiments performed by the control component 916 of the client-side application 910 and/or by one or more of vehicle applications 1230. The control plane may include, in the middleware 920, a system call interface component, for controlling the data plane system call API(s) 1810, for instance. For embodiments including the system call interface control-plane element, the interface may be considered shown also by block 1810. The downward-oriented data-flow arrows between (i) the control component 916 and/or vehicle application 1230 and (ii) the middleware 920 components at least in part indicate such control, as may the upward arrows to the control component 916/vehicle application(s) 1230 from the middleware 920, regarding control-related feedback to the control component 916/vehicle application(s) 1230.

XIII.P. Vehicle App Use of Add-On-Device Data, and Vice Versa

The application 1230 uses the processed or virtualized sensor data, such as add-on-device barometer data or camera data, in operations of the application 1230. In various implementations, this use is performed as if the sensor data originated form a vehicle sensor, or other hardware, configured and arranged to provide the same data.

Application 1230 operation can include delivery of application output to a receiving apparatus 1210, such as a vehicle-user interface—e.g., heads-up display (HUD) or other screen, a vehicle speaker, a vehicle autonomous driving system, a vehicle HVAC system, or a communication transceiver for sending a message to a remote device such as a remote customer-service (e.g., OnStar®) server or computer system.

For the analogous situations, in which the add-on device has a client application, for receiving vehicle-hardware data via a vehicle-side server application, the vehicle hardware data, processed or virtualized at the add-on device, is provided by the add-on device middleware (which would in this case be analogous or the same as the middleware 920 in FIG. 12) directly to an applicable add-on-device application(s) 1240, or to the application 1240 via an application API 1140. In this case, application 1240 operation can include delivery of application output to a receiving apparatus 1220, such as an add-on-device user interface—e.g., display screen, an add-on-device speaker, or an add-on-device communication transceiver for sending a message to a remote device such as a remote customer-service (e.g., OnStar®) server or computer system.

XIV. SELECT ADVANTAGES

Many of the benefits and advantages of the present technology are described above. The present section restates some of those and references some others. The benefits described are not exhaustive of the benefits of the present technology.

As mentioned, the present technology by various embodiments leverages sensing or output capabilities of one or more mobile or otherwise connectable devices, such as a smart phone, at a vehicle such as an automobile, an aircraft, or marine craft.

The underlying architecture incorporates, into vehicle operations, plug-in or wireless add-on device hardware output, or vice versa. Benefits include but are not limited to improving vehicle performance of functions relying on sensor feedback, enhancing vehicle-user interaction, and/or enabling implementation at the vehicle of advanced computing applications requiring sensing capabilities, or other hardware capability, that the vehicle would not have otherwise, or that the vehicle would be benefit from using instead of its own hardware.

Capabilities of after-market or on-the-road (OTR) vehicles can thus be enhanced with relative ease and at relatively low cost. Users and the vehicles they use are thus not limited to the sensing capabilities of the vehicle at the time it is originally manufactured.

The technology is useful, for example, regarding add-on devices configured such that kernel-level modification of the operating system is either not encouraged or not allowed. These devices typically do have programming, such as API format, and/or hardware, such as a USB port, allowing connection and hardware-data sharing between the vehicle system and add-on-device system configured according to the embodiments described herein, such as in the second example arrangements, from Section IV, on, above.

The technology in various an embodiments provides a middleware architectures solution. The solution, in various embodiments, implements operating system (OS)-proprietary APIs or open standard USB/IP Interface emulation. The arrangement allows a user, or their vehicle or add-on device, to leverage to provide robust I/O interface between vehicle and mobile sensors or other hardware. This can be done in an open, end-to-end system, as compared to closed systems in which the add-on device is manufactured originally (e.g., without the server/client applications and middleware described under the second examples of Section IX., and on, above) to mate and communicate with the vehicle. The add-on device can be made by a different manufacturer than that of, or a maker that is not coordinating with maker of, the vehicle system, for instance.

In various embodiments, the technology of at least the second examples (Section IX., and on) leverages existing operating system API architecture, of the add-on-device and/or vehicle system, to provide generic I/O interface between the vehicle system and add-on devices, such as mobile sensors.

The technology allows the vehicle system to access add-on hardware by leveraging an add-on-device OS API, regardless the particular structure of the add-on-device hardware (e.g., sensor) to be used by the vehicle.

The technology, in various embodiments, provides vehicle applications with generic sensor I/O capability by leveraging vehicle side OS API.

The technology, in various embodiments, provides the vehicle system with hardware output—e.g., sensor data—by using existing device driver interfaces to develop a proxy device driver.

The technology, in various embodiments, provides high flexibility in upgrading capability of an OTR vehicle, by updating only proxy device drivers and user space application(s).

Embodiments disclosed herein also allow robust implementation at the vehicle of add-on hardware employing codecs, such as for high-volume, or high-speed data processing. The high-volume data may include audio/video data, for instance, real-time voice or video interpretation, such as to determine whether a driver has made an important statement, or whether a pedestrian is in a camera view.

In various embodiments, the kernel space 930 is customized for the present technology, allowing the add-on-device-hardware sharing without need to alter or customize the kernel space 1130 of the add-on device 850.

In various embodiments, the technology allows relatively inexpensive addition of common, or known, sensors as well as less-common, uncommon, or unknown, sensors.

And the addition(s) can be performed without requiring changes to many, most or all primary on-board computer (OBC) features, such as vehicle operating system (OS) and original drivers—e.g., original vehicle sensor drivers.

Embodiments provide novel middleware, which in various embodiments is API-based. By configuring the systems as described, the operating system need not be changed to accomplish the goals of the present technology. Add-on devices that may not be inherently compatible with the vehicle system—such as by not being configured with pre-established cooperating structure, protocols, and the like—can be used with the vehicle, with the vehicle and the add-on device have the client/server applications described, and at least the respective middleware formats described.

The cost associated with effectively adding new sensor capabilities to an aftermarket, OTR, vehicle according to the present technology is much lower than the cost of retrofitting or upgrading the vehicle to include equivalent sensor hardware. Costs on the other hand of a retrofit include, for instance, labor, time, the new sensor hardware, and still other materials, such as mechanical and electrical connecting structures. Cost of implementing the present technology can be especially low when the user already has the add-on sensing device, such as if the device is an existing user phone.

XV. CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

References herein indicating direction are not made in limiting senses. For example, references to upper, lower, top, bottom, or lateral, are not provided to limit the manner in which the technology of the present disclosure can be implemented. While an upper surface may be referenced, for example, the referenced surface need not be vertically upward, in a design, manufacture, or operating reference frame, or above any other particular component, and can be aside of some or all components in design, manufacture and/or operation instead, depending on the orientation used in the particular application.

Directional references are provided herein mostly for ease of description and for simplified description of the example drawings, and the thermal-management systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface is referenced, for example, the referenced surface can, but need not be vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A vehicle system, for use in virtualizing a hardware component of a previously unknown add-on device for use by a vehicle application being executed at a vehicle of transportation, comprising:
   a hardware-based processing unit; and
   a computer-readable storage device comprising a client application, middleware components, kernel-space components, and the vehicle application, wherein:
      the client application, when executed by the hardware-based processing unit, communicates with an add-on-device server application and obtains add-on-device-hardware data from the add-on-device server application;
      the middleware components comprise an emulated system-call application-program-interface module that, when executed by the hardware-based processing unit, receives the add-on-device-hardware data from the client application, processes the add-on-device-hardware data, sends the add-on-device-hardware data for further processing to the kernel-space components, and receives the add-on-device-hardware data having been further processed at the kernel space; and
      the middleware components comprise a frameworks-and-abstraction module that, when executed by the hardware-based processing unit, receives add-on-device-hardware data and sends the data for use at the vehicle application;
   wherein the client application obtaining the add-on-device-hardware data from the add-on-device server application, the processing of the add-on-device-hardware data by the emulated system-call application-program-interface module, the further processing of the kernel-space components, and the sending of the data for use by the vehicle application enable virtualizing of the previously unknown add-on device for use by the vehicle application, providing sensor data to the vehicle application from the previously unknown add-on device thereby providing sensing capabilities to the vehicle application that the vehicle application does not have otherwise; and
   wherein the vehicle application is initially unable to virtualize the previously unknown add-on device prior to the client application communicating with the add-on-device server application.

2. The vehicle system of claim 1 wherein the hardware-based processing unit, executing code of the storage device, downloads the client application, the emulated system-call application-program-interface module, the kernel-space components, and the frameworks-and-abstraction module as after-market additions to the vehicle system.

3. The vehicle system of claim 1 wherein the vehicle application includes a user application configured to provide user output based on the add-on-device-hardware data processed at the frameworks-and-abstraction module.

4. The vehicle system of claim 1 wherein the vehicle application is configured to affect a vehicle function based on the add-on-device-hardware data processed at the frameworks-and-abstraction module.

5. The vehicle system of claim 1 wherein the emulated system-call application-program-interface module is configured to emulate an add-on-device system-call-application-program-interface module.

6. The vehicle system of claim 1 wherein the frameworks-and-abstraction module is configured to emulate an add-on-device frameworks-and abstraction module.

7. The vehicle system of claim 1 wherein the kernel-space components comprise a proxy-hardware-device driver configured to emulate an add-on-device hardware-device driver.

8. The vehicle system of claim 1 wherein the kernel-space components comprise a virtual subsystem configured to emulate an add-on-device subsystem.

9. The vehicle system of claim 1 wherein:
   the add-on-device hardware data received at the client application has been encoded, by encoder components of the add-on device; and
   the kernel-space components comprise a virtual subsystem, a decoder device driver, and a proxy sensor device driver configured to decode the add-on-device hardware data, and send the decoded add-on-device hardware data to the emulated system-call application-program-interface module of the middleware components.

10. The vehicle system of claim 9 wherein:
   the virtual subsystem kernel-space component, when executed by the processing unit, receives the encoded add-on-device hardware data from the emulated system-call application-program-interface module, and sends the encoded add-on-device hardware data to the decoder device driver of the middleware components;
   the decoder device driver, when executed by the processing unit, interfaces with a decoder-hardware component of the vehicle system for decoding the encoded add-on-device hardware data, and sends the decoded add-on-device hardware data to the virtual subsystem by way of the proxy sensor device driver; and
   the virtual subsystem sends the decoded add-on-device hardware data to the emulated system-call-application-program-interface module.

11. The vehicle system of claim 1 wherein the client application comprises a discover component that, when executed by the processing unit, performs a service-discovery process to determine availability and technical capability of the add-on-device hardware and whether the add-on-device hardware can be virtualized at the vehicle.

12. The vehicle system of claim 11 wherein the service-discovery process comprises discovering the add-on device and, in response to discovering the add-on device, discovering a hardware service of the add-on device that is available to be virtualized for use at the vehicle system.

13. A vehicle system, for use in virtualizing a hardware component of a previously unknown add-on device for use by a vehicle application being executed at a vehicle, comprising:
    a hardware-based processing unit; and
    a computer-readable storage device comprising a client application, middleware components, kernel-space components, and the vehicle application, wherein:
        the client application, when executed by the hardware-based processing unit, communicates with an add-on-device server application and obtains add-on-device-hardware data from the add-on-device server application;
        the middleware components comprise a client-side universal-serial-bus core driver that, when executed by the hardware-based processing unit, receives add-on-device-hardware data from the client application; and
        the middleware components comprise a universal-serial-bus per-device driver that, when executed by the hardware-based processing unit, receives the add-on-device-hardware data processed at the client-side universal-serial-bus core driver, and sends the add-on-device-hardware data for use at the vehicle application;
    wherein the client application obtaining the add-on-device-hardware data from the add-on-device server application and the sending of the data for use by the vehicle application enable virtualizing of the previously unknown add-on device for use by the vehicle application, providing sensor data to the vehicle application from the previously unknown add-on device thereby providing sensing capabilities to the vehicle application that the vehicle application does not have otherwise; and
    wherein the vehicle application is initially unable to virtualize the previously unknown add-on device prior to the client application communicating with the add-on-device server application.

14. The vehicle system of claim 13 wherein the hardware-based processing unit, executing code of the storage device, downloads the client application, the emulated system-call application-program-interface module, the kernel-space components, and the frameworks-and-abstraction module as after-market additions to the vehicle system.

15. The vehicle system of claim 13 wherein:
    the kernel space comprises a virtual universal-serial-bus host-controller-interface driver that, when executed by the hardware-based processing unit, receives the add-on-device-hardware data from the client application; and
    the client-side universal-serial-bus core driver, when executed to receive the add-on-device-hardware data from the client application, receives the add-on-device-hardware data from the client application after processing at the virtual universal-serial-bus host-controller-interface driver.

16. The vehicle system of claim 13 wherein the vehicle application:
    includes a user application configured to provide user output based on the add-on-device-hardware data processed at the frameworks-and-abstraction module; or
    is configured to affect a vehicle function based on the add-on-device-hardware data processed at the frameworks-and-abstraction module.

17. The vehicle system of claim 13 wherein:
    the virtual universal-serial-bus host-controller-interface driver is configured to emulate an add-on-device universal-serial-bus host-controller-interface driver;
    the universal-serial-bus core driver, client-side, module is configured to emulate an add-on-device universal-serial-bus core driver; and
    the universal-serial-bus per-device driver is configured to emulate an add-on-device side stub driver.

18. The vehicle system of claim 13 wherein:
    the client application comprises a discover component that, when executed by the processing unit, performs a service-discovery process to determine that the add-on-device hardware is available and can be virtualized at the vehicle; and
    the service-discovery process comprises discovering the add-on device and, in response to discovering the add-on device, discovering a hardware service of the add-on device.

19. A vehicle system, for use in virtualizing a hardware component of a previously unknown add-on device for use by a vehicle application being executed at a vehicle of transportation, comprising:
    a hardware-based processing unit; and
    a computer-readable storage device comprising a client application, middleware components, kernel-space components, and a vehicle application, wherein:
        the client application, when executed by the hardware-based processing unit, communicates with an add-on-device server application and obtains add-on-device-hardware data from the add-on-device server application;
        the middleware components are configured to emulate add-on-device middleware components;
        the kernel-space components are configured to emulate add-on-device kernel-space components; and
        the middleware components, when executed by the processing unit, send the add-on-device hardware data, having been processed at the kernel-space components and the middleware components, to the vehicle application for use;
    wherein the client application obtaining the add-on-device-hardware data from the add-on-device server application, the processing of the add-on-device-hardware data by the middleware components and of the kernel-space components, and the sending of the data for use by the vehicle application enable virtualizing of the previously unknown add-on device for use by the vehicle application, providing sensor data to the vehicle application from the previously unknown add-on device thereby providing sensing capabilities to the vehicle application that the vehicle application does not have otherwise; and
    wherein the vehicle application is initially unable to virtualize the previously unknown add-on device prior to the client application communicating with the add-on-device server application.

20. A system, for use in virtualizing a resource of a previously unknown add-on device for use by a system application, comprising:
    a hardware-based processing unit; and
    a computer-readable storage device comprising a client application, middleware components, kernel-space components, and a system application, wherein:
        the client application, when executed by the hardware-based processing unit, communicates with an addon-device server application and obtains add-on-device-hardware data from the add-on-device server application;

the middleware components are configured to emulate add-on-device middleware components;

the kernel-space components are configured to emulate add-on-device kernel-space components; and the middleware components, when executed by the processing unit, send the add-on-device resource data, having been processed at the kernel-space components and the middleware components, to the system application for use;

wherein the client application obtaining the add-on-device-hardware data from the add-on-device server application, the processing of the add-on-device-hardware data by the middleware components and of the kernel-space components, and the sending of the data for use at the system application enable virtualizing of the previously unknown add-on device for use by the system application, providing sensor data to the vehicle application from the previously unknown add-on device thereby providing sensing capabilities to the vehicle application that the vehicle application does not have otherwise; and wherein the vehicle application is initially unable to virtualize the previously unknown add-on device prior to the client application communicating with the add-on-device server application.

\* \* \* \* \*